(12) United States Patent
Herman et al.

(10) Patent No.: US 10,888,881 B2
(45) Date of Patent: Jan. 12, 2021

(54) VARIABLE INERTIAL PARTICLE SEPARATOR

(71) Applicant: CUMMINS FILTRATION IP, INC., Columbus, IN (US)

(72) Inventors: Peter K. Herman, Stoughton, WI (US); Matthew Louison, McFarland, WI (US)

(73) Assignee: Cummins Filtration IP, Inc., Columbus, IN (US)

( * ) Notice: Subject to any disclaimer, the term of this patent is extended or adjusted under 35 U.S.C. 154(b) by 0 days.

(21) Appl. No.: 16/606,082

(22) PCT Filed: May 7, 2018

(86) PCT No.: PCT/US2018/031326
§ 371 (c)(1),
(2) Date: Oct. 17, 2019

(87) PCT Pub. No.: WO2018/208650
PCT Pub. Date: Nov. 15, 2018

(65) Prior Publication Data
US 2020/0376501 A1    Dec. 3, 2020

Related U.S. Application Data

(60) Provisional application No. 62/503,037, filed on May 8, 2017.

(51) Int. Cl.
*B01D 45/00* (2006.01)
*B04C 3/06* (2006.01)
(Continued)

(52) U.S. Cl.
CPC ............... *B04C 3/06* (2013.01); *B01D 45/16* (2013.01); *B04C 11/00* (2013.01); *F16K 15/026* (2013.01);
(Continued)

(58) Field of Classification Search
CPC ..... B04C 3/06; B04C 11/00; B04C 2003/006; B04C 5/103; F16K 15/026; B01D 45/16;
(Continued)

(56) References Cited

U.S. PATENT DOCUMENTS 3,763,882 A * 10/1973 Shoop ................... F16K 15/026
137/494
4,147,630 A    4/1979 Laval, Jr.
(Continued)

FOREIGN PATENT DOCUMENTS

DE    20 2018 000 498    4/2018
GB    2 367 774    4/2004

OTHER PUBLICATIONS

International Search Report and Written Opinion issued for PCT/US2018/031326, dated Aug. 8, 2018, 13 pages.
(Continued)

*Primary Examiner* — Dung H Bui
(74) *Attorney, Agent, or Firm* — Foley & Lardner LLP

(57) ABSTRACT

Inertial particle separators having an axially translating or a deformable poppet component are described. The poppet component axially translates to accommodate a wide range of flowrates through the inertial particle separator. In some arrangements, the poppet component is biased by a spring towards a closed or restricted position. The variable flowrate and constriction provided by the poppet maintains a substantially constant pressure drop and separation efficiency during operation across a wide range of flowrates through the separators.

28 Claims, 35 Drawing Sheets

(51) Int. Cl.
  *B01D 45/16* (2006.01)
  *F16K 15/02* (2006.01)
  *B04C 11/00* (2006.01)
  *B04C 3/00* (2006.01)
  *F02M 35/024* (2006.01)
  *F02C 7/052* (2006.01)
  *B04C 5/103* (2006.01)
  *A46B 5/00* (2006.01)

(52) U.S. Cl.
  CPC ..... *A46B 5/0095* (2013.01); *A46B 2200/3006* (2013.01); *B04C 5/103* (2013.01); *B04C 2003/006* (2013.01); *F02C 7/052* (2013.01); *F02M 35/024* (2013.01)

(58) Field of Classification Search
  CPC ............... F02M 35/024; F02C 7/052; A46B 2200/3006; A46B 5/0095
  See application file for complete search history.

(56) References Cited

U.S. PATENT DOCUMENTS

| | | | |
|---|---|---|---|
| 5,829,560 A | * | 11/1998 | Mainquist ........... F16H 61/0009 |
| | | | 192/3.57 |
| 5,947,380 A | | 9/1999 | Coldren et al. |
| 6,134,874 A | | 10/2000 | Stoten |
| 7,017,222 B2 | | 3/2006 | Dunn |
| 7,802,433 B2 | | 9/2010 | Higgins |
| 7,964,009 B2 | | 6/2011 | Herman et al. |
| 8,104,362 B2 | | 1/2012 | Mcfarland et al. |
| 2003/0159412 A1 | | 8/2003 | North |
| 2010/0024891 A1 | * | 2/2010 | Francini ................ F16K 15/026 |
| | | | 137/14 |
| 2016/0281748 A1 | | 9/2016 | Lynn et al. |

OTHER PUBLICATIONS

First Office Action issued for Indian Patent Application No. IN201947042836, dated Oct. 22, 2020, 6 pages.

* cited by examiner

Contours of Velocity Magnitude (m/s)

Contours of Static Pressure (inches-water)

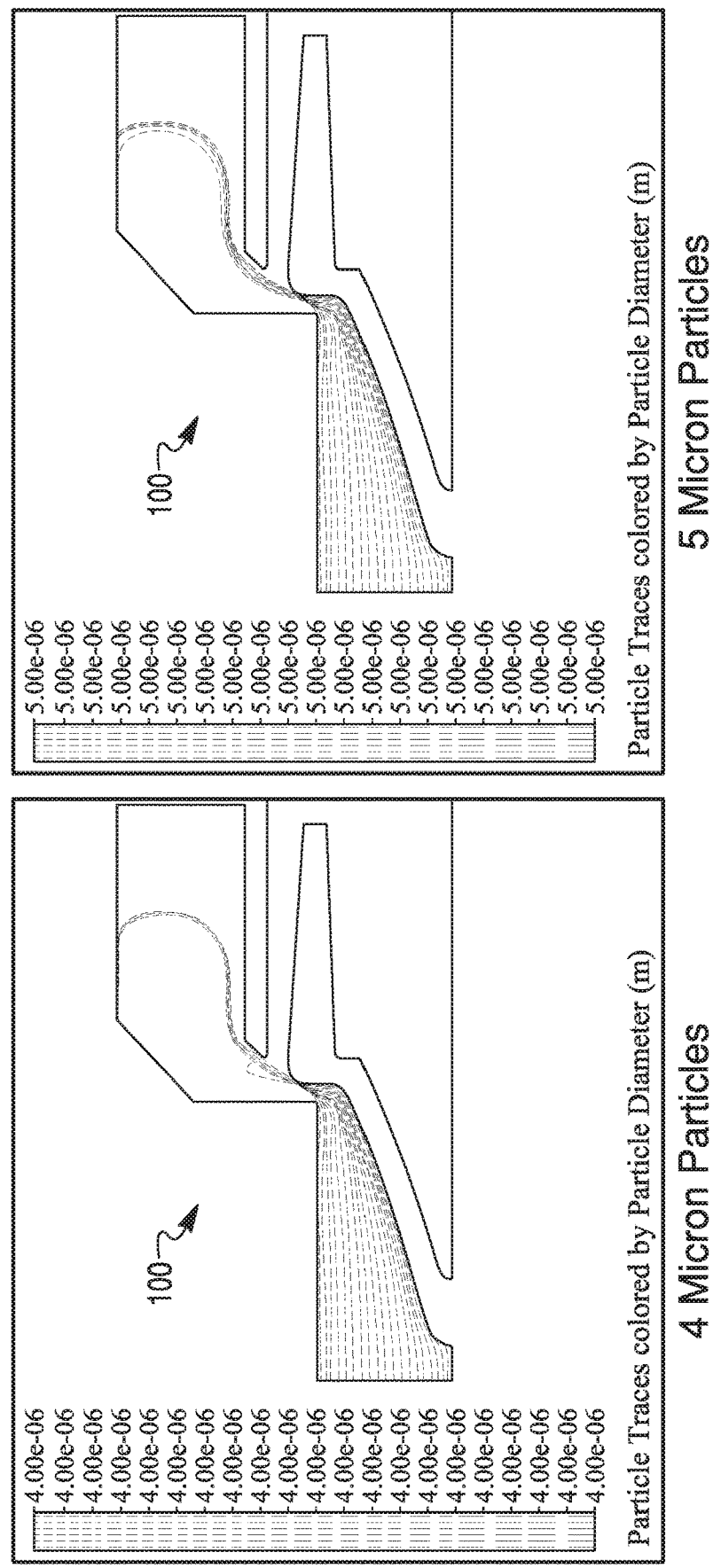

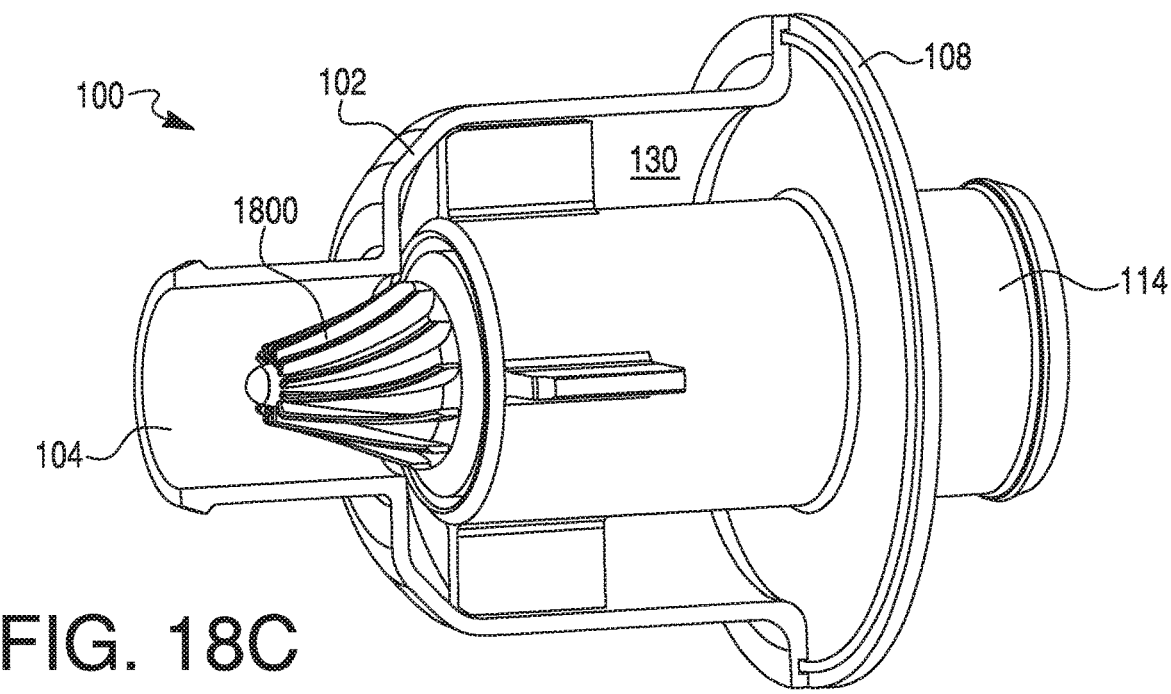
FIG. 18C
FIG. 18D
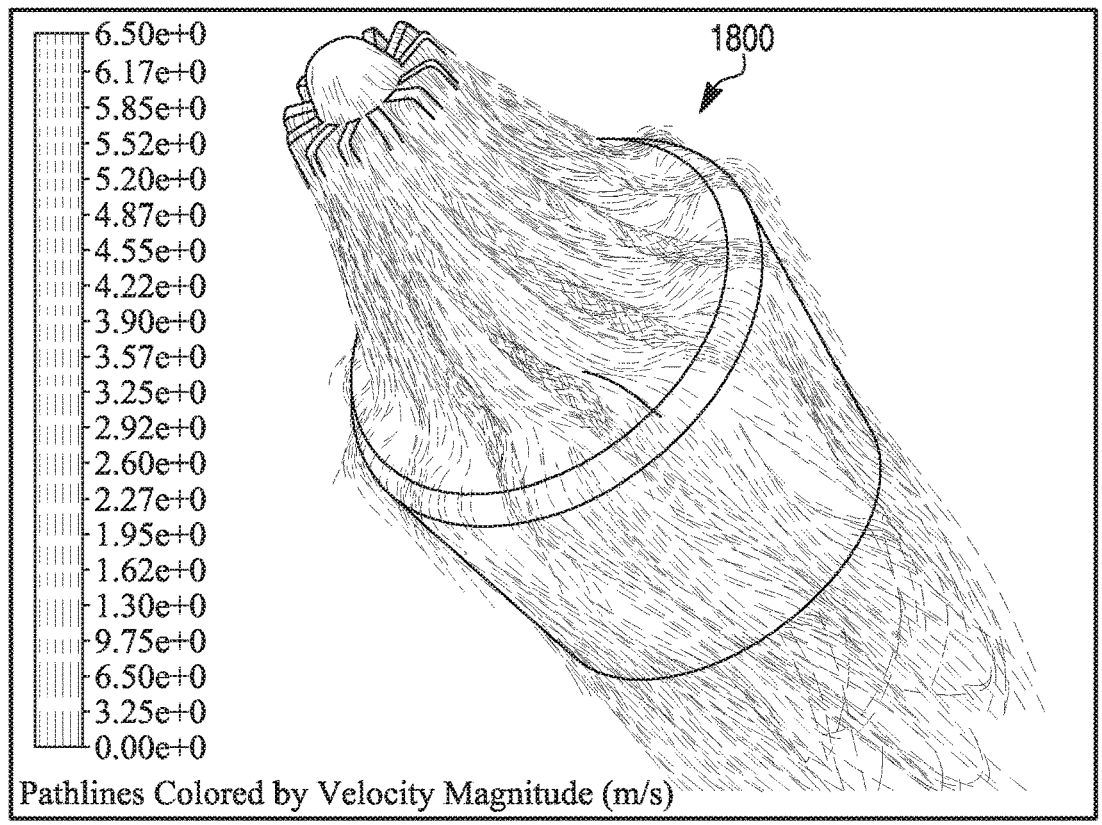
Pathlines Colored by Velocity Magnitude (m/s)

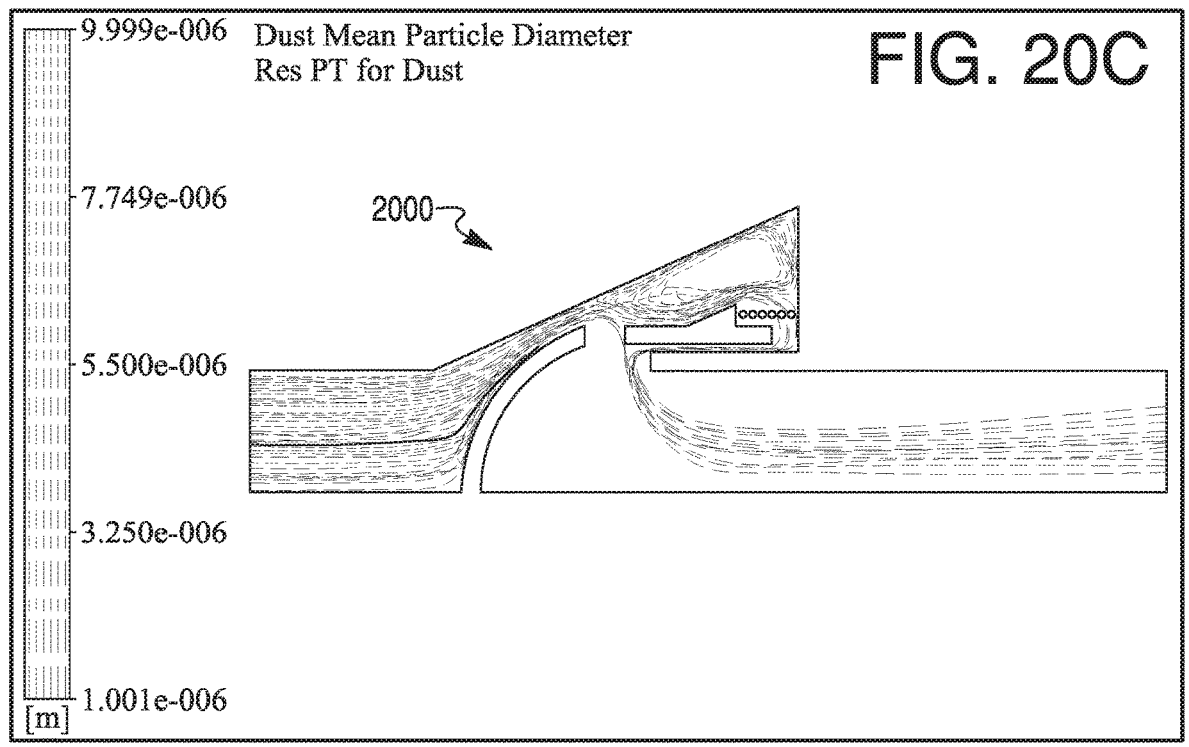
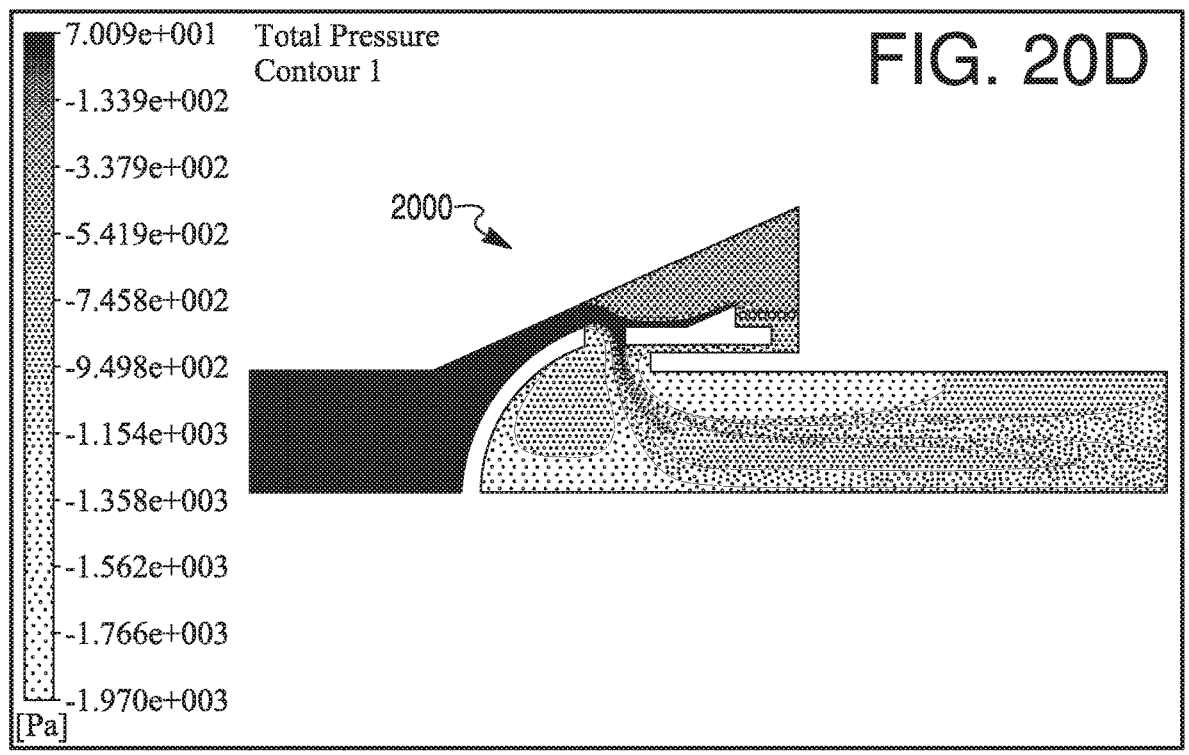

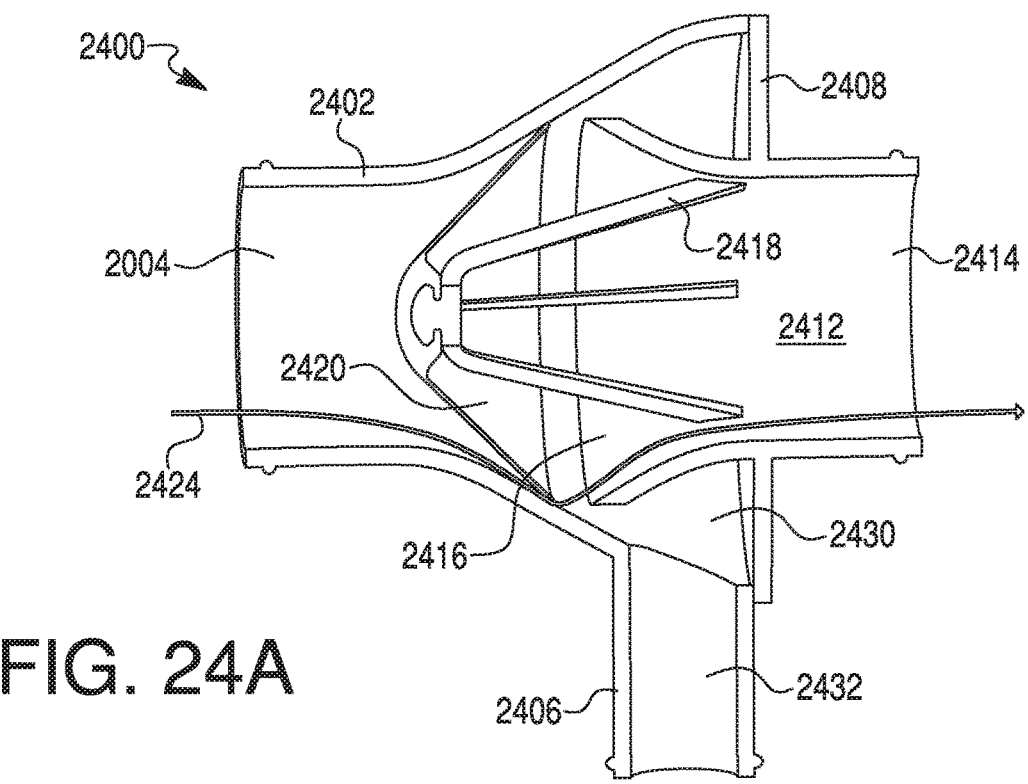
FIG. 24A
FIG. 24B
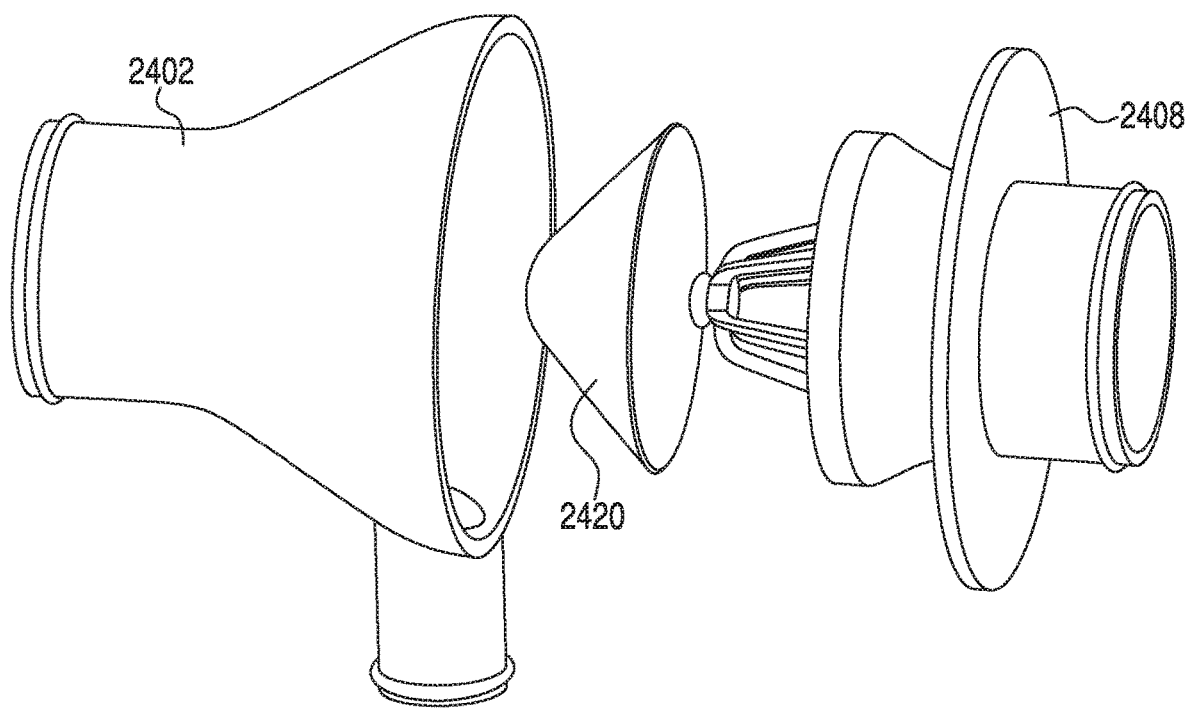

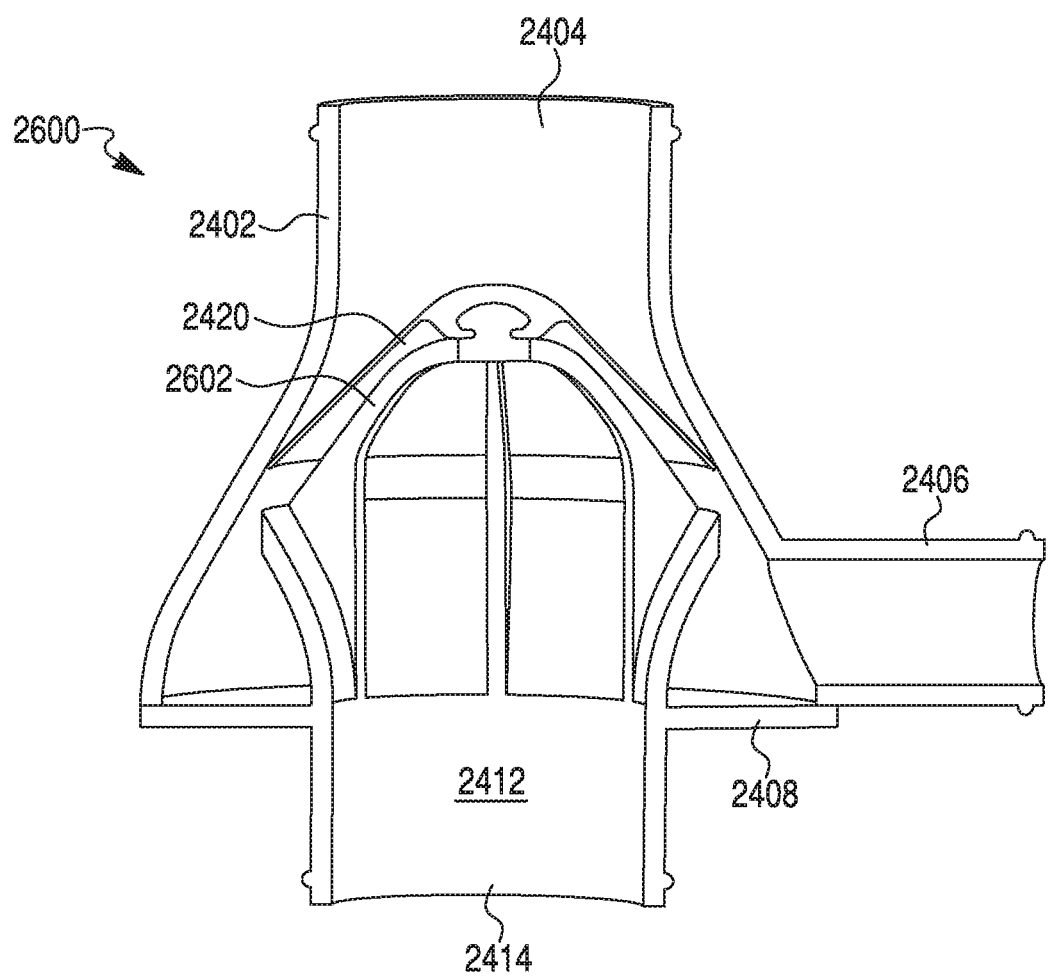

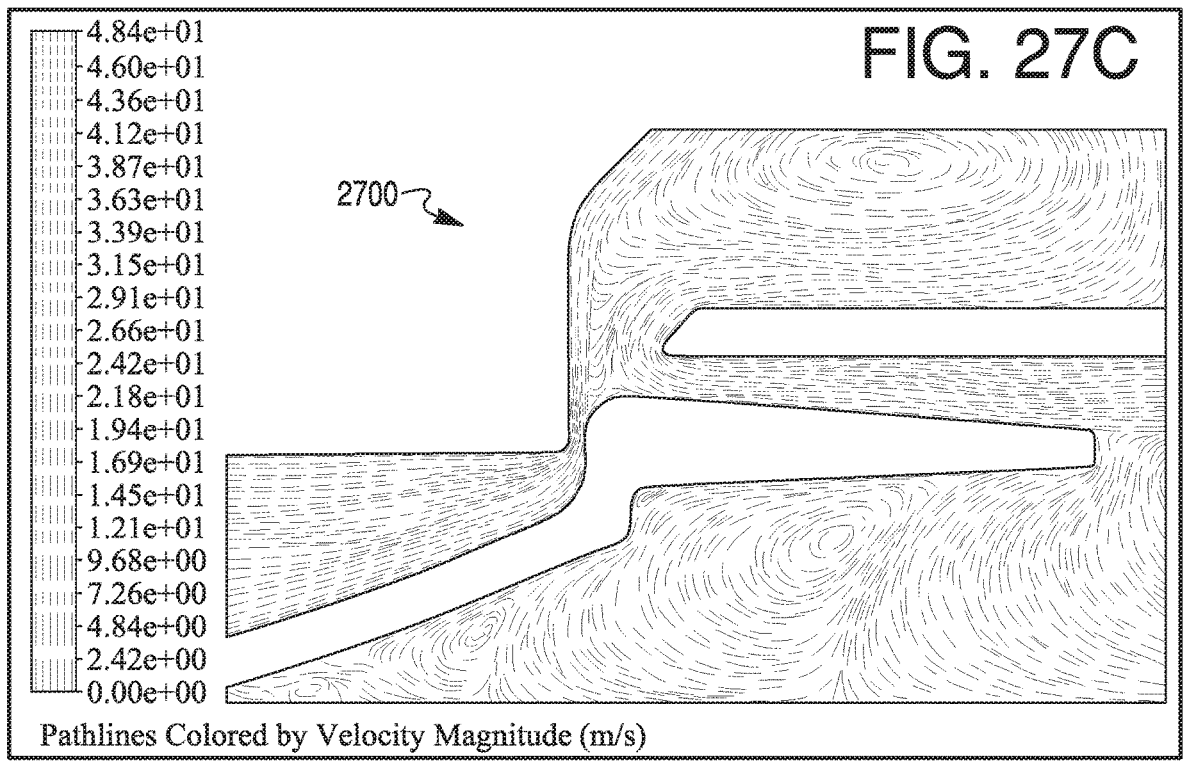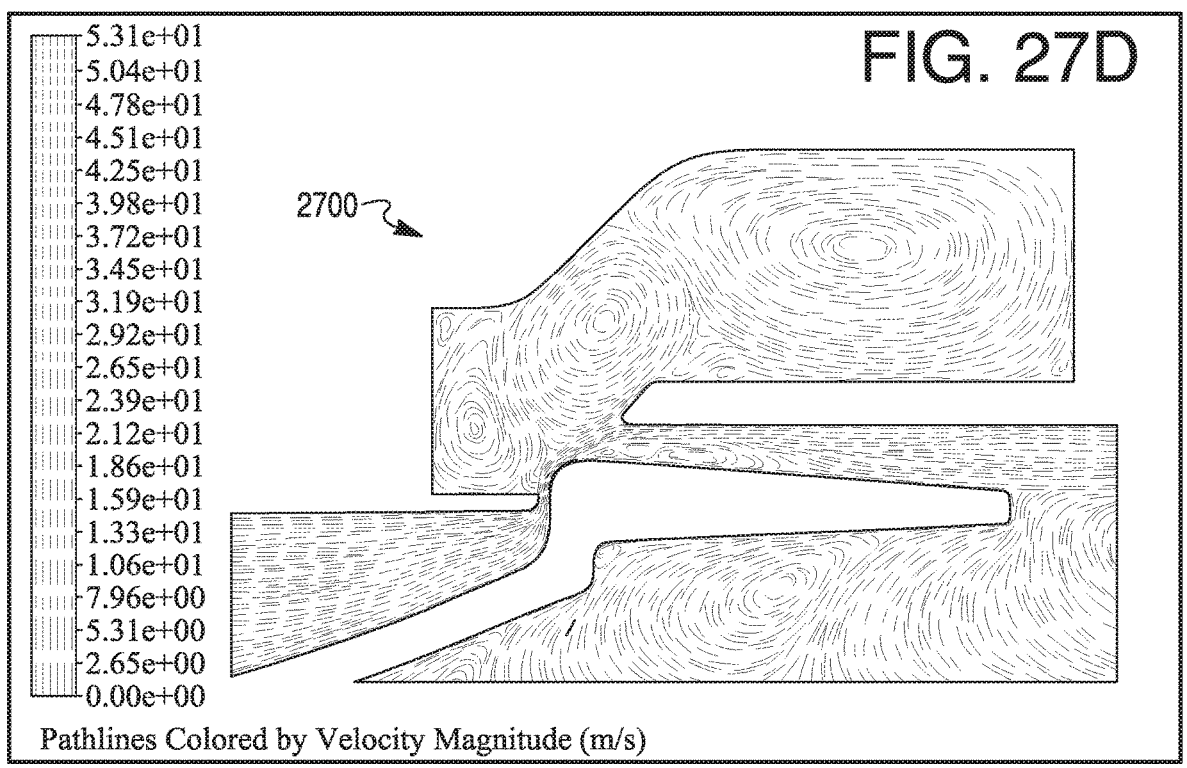

VARIABLE INERTIAL PARTICLE SEPARATOR

CROSS REFERENCE TO RELATED APPLICATIONS

The present application is a national stage of PCT Application No. PCT/US2018/031326, filed May 7, 2018 which claims the benefit of priority to U.S. Provisional Patent Application No. 62/503,037, filed on May 8, 2017. The contents of these applications are incorporated herein by reference in their entirety.

TECHNICAL FIELD

The present application relates to inertial particle separators.

BACKGROUND

Internal combustion engines generally combust a mixture of fuel (e.g., gasoline, diesel, natural gas, etc.) and air. Prior to entering the engine, the intake air is typically passed through a filtration system to remove contaminants (e.g., dust, water, oil, etc.) from the intake air. The filtration system includes a filter element having filter media. As the air passes through the filter media of the filter element, the filter media removes at least a portion of the contaminants in the air thereby preventing unwanted contaminants from entering the internal combustion engine.

Some air filtration systems utilize a precleaner, such as a centrifugal separator, upstream of the filter element to remove larger dust and debris prior to the intake air passing through the filter element. By removing at least a portion of the contaminants from the intake air upstream of the filter element, the precleaner extends the life of the filter element. However, under low air flow consumption (e.g., at engine idle), the efficiency of such centrifugal separators is substantially decreased. Accordingly, as flow rate through the centrifugal separator decreases, separation efficiency of the centrifugal separator also decreases, sometimes at an exponential rate.

SUMMARY

Various example embodiments relate to arrangements of variable inertial particle separators. One such inertial particle separator comprises a housing defining a central compartment. The housing further comprises an inlet and a dust port. The inertial particle separator further comprises an inner body coupled to the housing. The inner body comprising a central tube having a first end extending into the central compartment and a second end defining an outlet. The inertial particle separator comprises a poppet positioned adjacent to the first end of the central tube. The poppet is movable or deformable between a closed position, in which the first end is blocked, and an open position, in which the first end is at least partially unblocked, the poppet being biased to the closed position.

Various other example embodiments relate to arrangements of variable inertial particle separators. One such inertial particle separator comprises a housing defining a central compartment. The housing further comprises an inlet and a dust port. The inertial particle separator further comprises an inner body coupled to the housing. The inner body comprising a central tube having a first end extending into the central compartment and a second end defining an outlet. The inertial particle separator comprises a poppet disposed over an outer surface of the central compartment and positioned adjacent to the first end of the central tube. The poppet is movable or deformable between a closed position, in which the first end is blocked, and an open position, in which the first end is at least partially unblocked, the poppet being biased to the closed position.

Various other example embodiments relate to arrangements of variable inertial particle separators. One such inertial particle separator comprises a housing defining a central compartment. The housing further comprises an inlet and a dust port. The inertial particle separator further comprises an inner body coupled to the housing. The inner body comprising a central tube having a first end extending into the central compartment and a second end defining an outlet. The inertial particle separator comprises a flexible poppet positioned adjacent to the first end of the central tube. The flexible poppet is deformable between a closed position, in which the first end is blocked, and an open position, in which the first end is at least partially unblocked, the flexible poppet being biased to the closed position.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 1 shows a perspective view of the inertial particle separator. FIGS. 2, 3, 4, 5, 6, and 10 each show different cross-sectional views of inertial particle separator. FIGS. 7, 8, and 9 each show different views of the poppet of the inertial particle separator. FIG. 11 shows a side view through the outlet of the inertial particle separator. FIGS. 12, 13, 14, 15, and 16 each show different plots of fluid flowing through the inertial particle separator.

FIGS. 18A through 18F show different views of a poppet according to another example embodiment.

FIGS. 24A through 24G show views of an inertial particle separator according to another example embodiment.

FIG. 26 shows a cross-sectional view of an inertial particle separator according to an example embodiment.

FIGS. 27A through 27D show views of a modified housing of the inertial particle separator of FIG. 1.

DETAILED DESCRIPTION

Referring to the figures generally, inertial particle separators having an axially translating poppet component are described. The poppet component axially translates to accommodate a wide range of flowrates through the inertial particle separator. The poppet component is biased by a spring or other biasing member towards a closed or restricted position. The variable flowrate and constriction provided by the poppet maintains substantially constant pressure drop and separation efficiency during operation across a wide range of flowrates through the separators.

Figure 1:
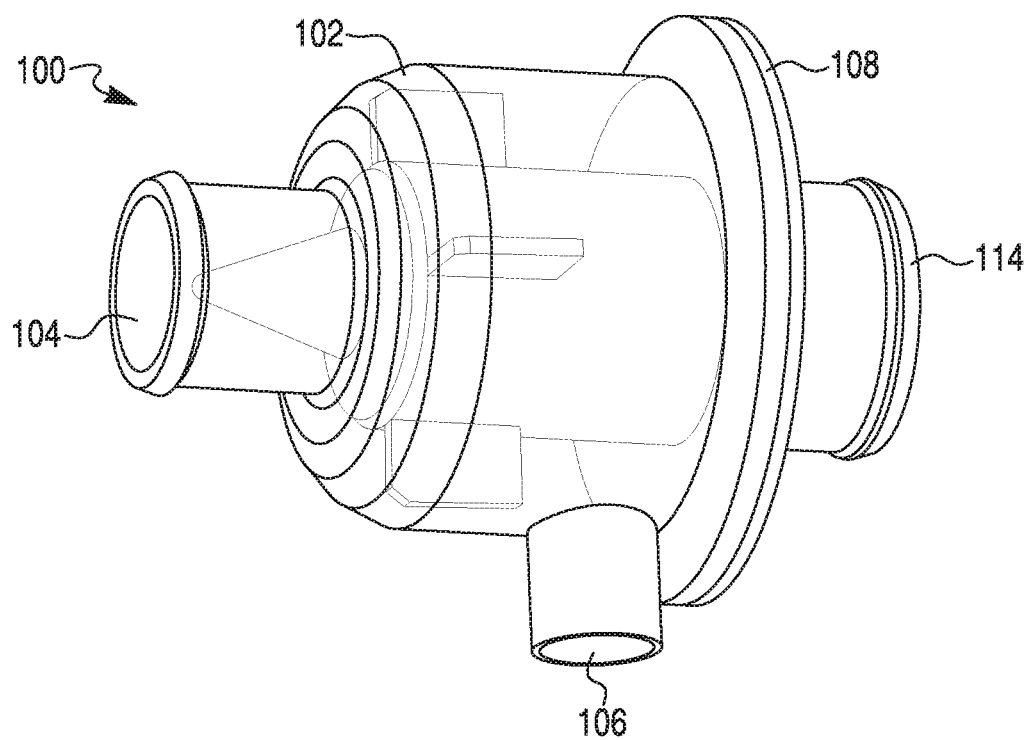
FIGS. 1-16 show various views of an inertial particle separator and air flow diagrams through the inertial particle separator are shown according to an example embodiment.
Figure 7:
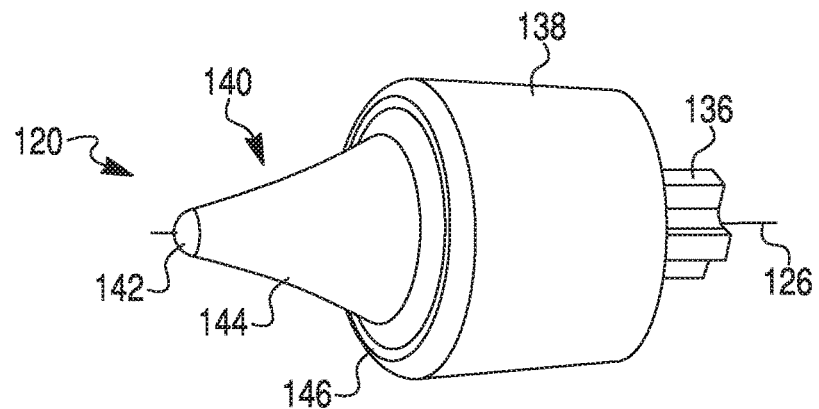
Figure 8:
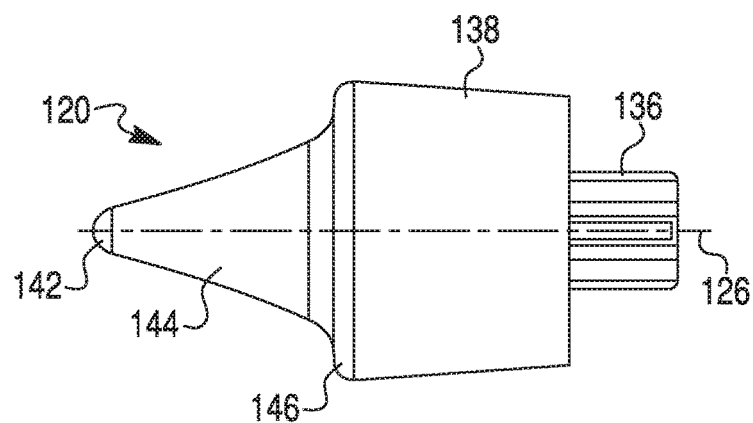
Figure 9:
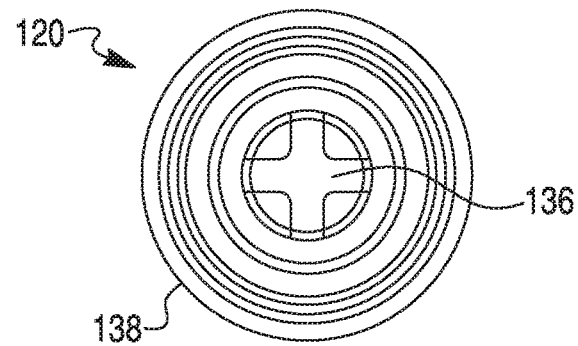
Figure 10:
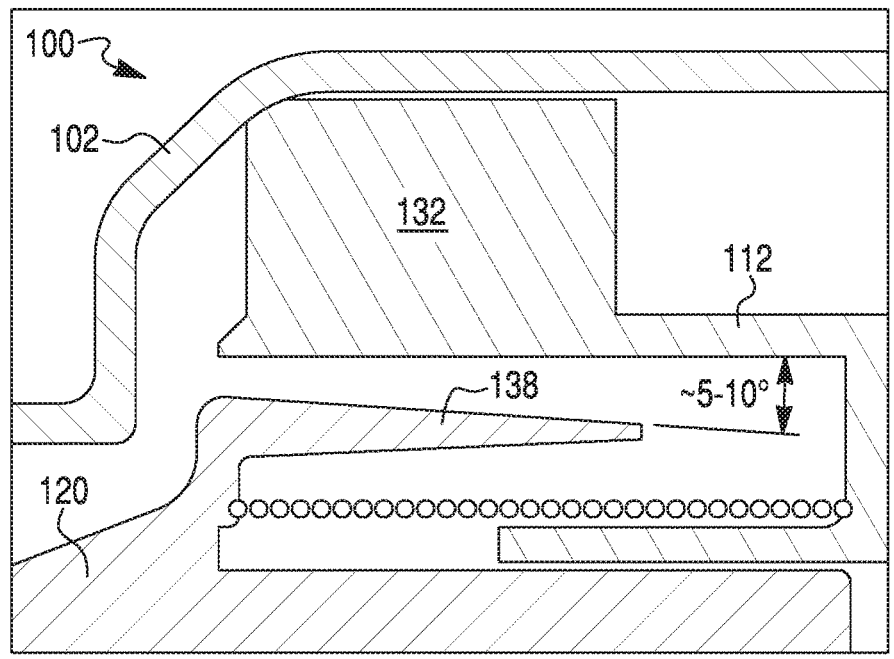
Figure 11:
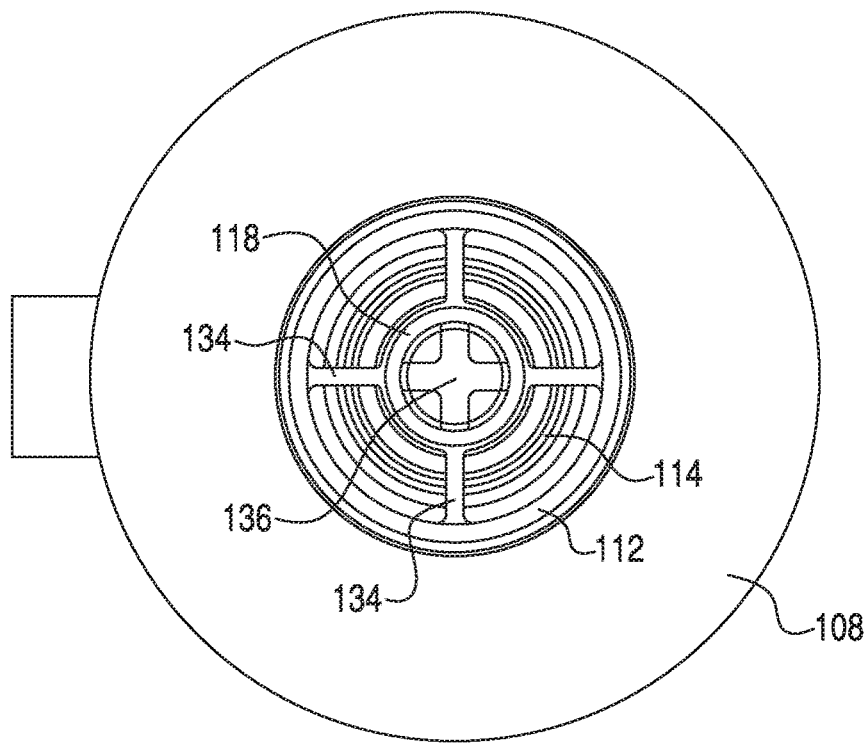

Referring to FIGS. 1-16, various views of an inertial particle separator 100 and air flow diagrams through the inertial particle separator 100 are shown according to an example embodiment. FIG. 1 shows a perspective view of the inertial particle separator 100. FIGS. 2, 3, 4, 5, 6, and 10 each show different cross-sectional views of inertial particle separator 100. FIGS. 7, 8, and 9 each show different views of the poppet 120 of the inertial particle separator 100. FIG. 11 shows a side view through an outlet 114 of the inertial particle separator 100. FIGS. 12, 13, 14, 15, and 16 each show different plots of fluid flowing through the inertial particle separator 100.

Figure 2:
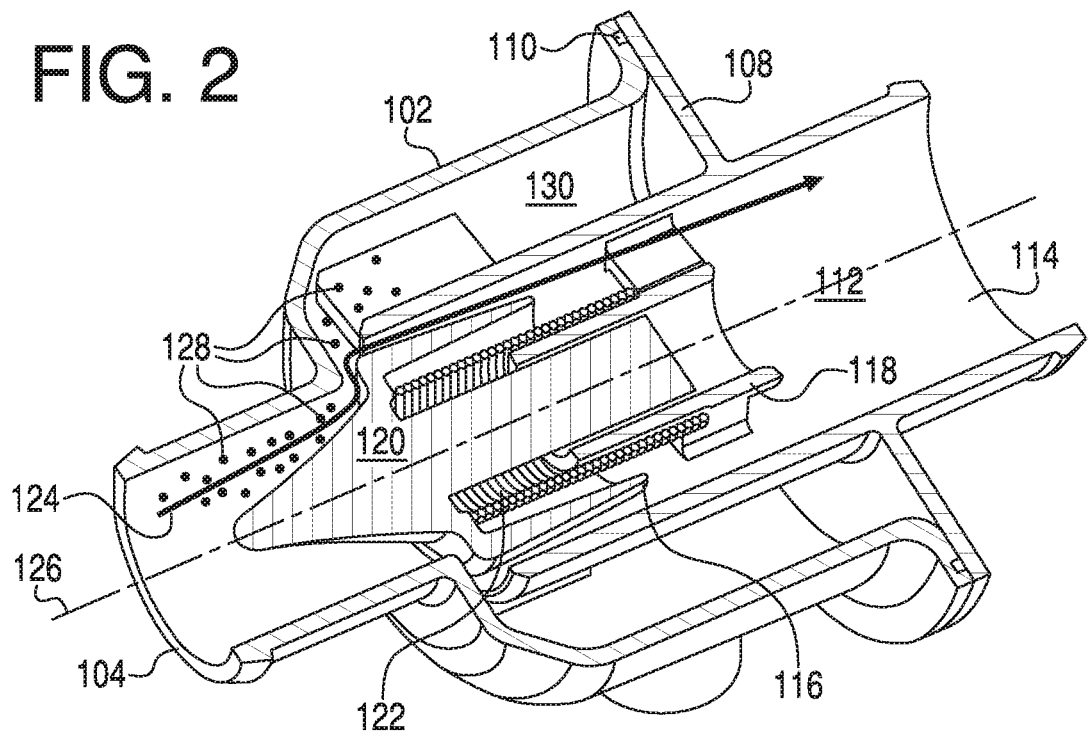
Figure 3:
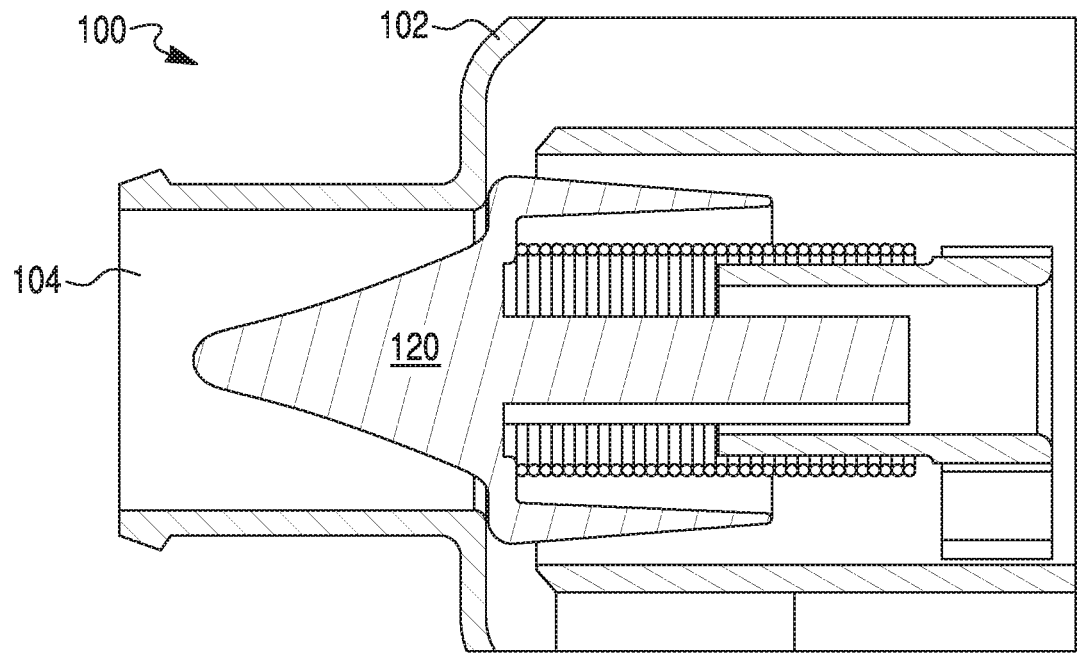

As shown best in FIGS. 1 and 2, the inertial particle separator 100 includes a housing 102 having an inlet 104 and a dust port 106. In some arrangements, the dust port 106 is fitted with a dust ejection valve, such as a rubber duckbill valve. The housing 102 is removably coupled to an inner body 108. In some arrangements, the housing 102 presses a seal member 110 against a surface of the inner body 108. The inner body 108 comprises a central tube 112 that includes an outlet 114 extending away from the housing 102 and an inlet portion 116 extending into a central compartment defined by the housing 102. The inner body 108 further comprises a poppet support 118 positioned within the central tube 112. A poppet 120 is movably coupled to the poppet support 118. The poppet 120 is movable between a closed position (as shown in FIG. 3) and an open position (as shown in FIGS. 2, 4, 5, 6, and 7). The poppet 120 is biased towards the closed position by a spring 122 coupled to the poppet 120 and the poppet support 118.

Generally, the flow of air through the inertial particle separator 100 is designated by the flow path 124. Air generally enters the housing 102 through the inlet 104. The air is turned by a curved outer surface of the poppet 120 to a direction substantially perpendicular to a central axis 126 defined by the central tube 112 upstream of the inlet portion 116 of the central tube 112. The pressure of the air against the poppet 120 causes the poppet 120 to move from the closed position to the open position or a partially opened position. In some arrangements, the central tube 112 is connected to a suction device via the outlet 114 that pulls scavenge flow through the central tube 112 thereby drawing the poppet 120 into the open position. In such arrangements, the scavenge airflow may be between 2-10% of total airflow through the inertial particle separator. The suction device may comprise, for example, an exhaust educator, a vacuum, an internal combustion engine intake, or a combination thereof. The air then makes a sharp turn into the central tube 112 and out the outlet 114. Because the particles 128 contained in the air upstream of the poppet 120 (e.g., dirt, dust, debris, etc.) have a relatively higher mass compared to the air carrying the particles 128, at least a portion of the particles 128 cannot make the turn into the central tube 112 and are separated from the air stream. The separated particles 128 are routed into a dust radial discharge zone 130 of the housing 102, and out the dust port 106. The operation of the inertial particle separator 100 and the arrangement of the components is described in further detail below.

Figure 4:
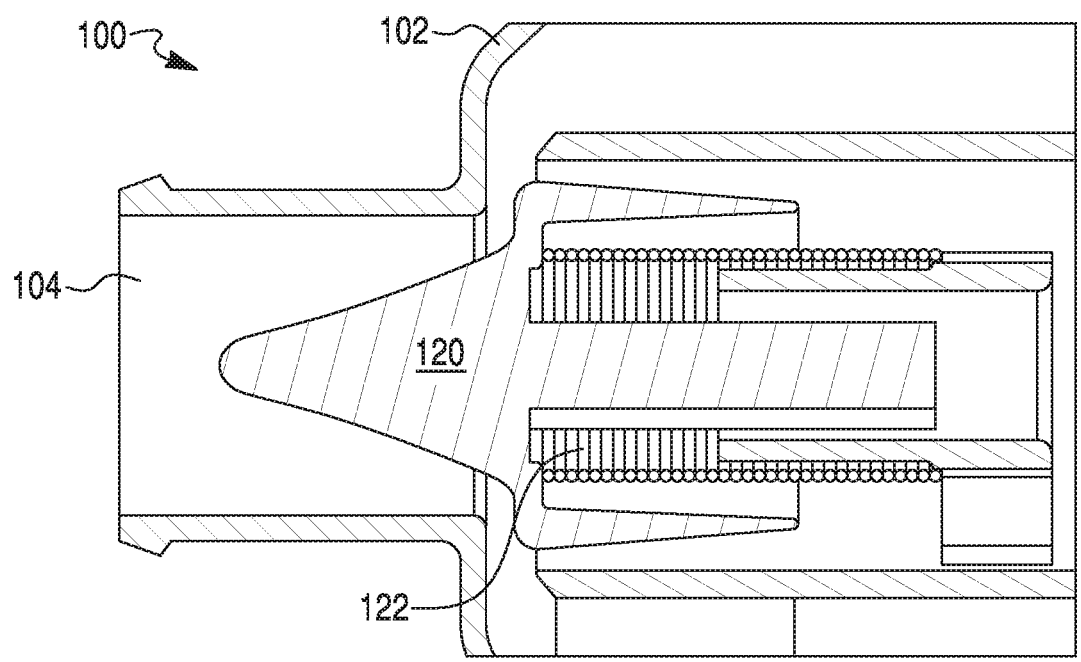

Referring to FIGS. 3 and 4, cross-sectional views of the inertial particle separator 100 are shown. FIG. 3 shows the poppet 120 of the inertial particle separator 100 in the closed position. FIG. 4 shows the poppet 120 of the inertial particle separator 100 in the open position. As shown in FIG. 3, when the poppet 120 is in the closed position, the poppet 120 blocks the inlet 104 of the housing 102. In some arrangements, when the poppet 120 is in the closed position, at least a portion of the poppet 120 is in contact with an inner surface of the housing 102. As shown in FIG. 4, when the poppet 120 is in the open position, the spring 122 is compressed and the poppet 120 is displaced from the inner surface of the housing 102 thereby allowing air to flow through the inlet 104. The poppet 120 is movable to any position between the closed position and the open position (e.g., to a partially open position) depending on the amount of air flowing the inertial particle separator 100.

Figure 5:
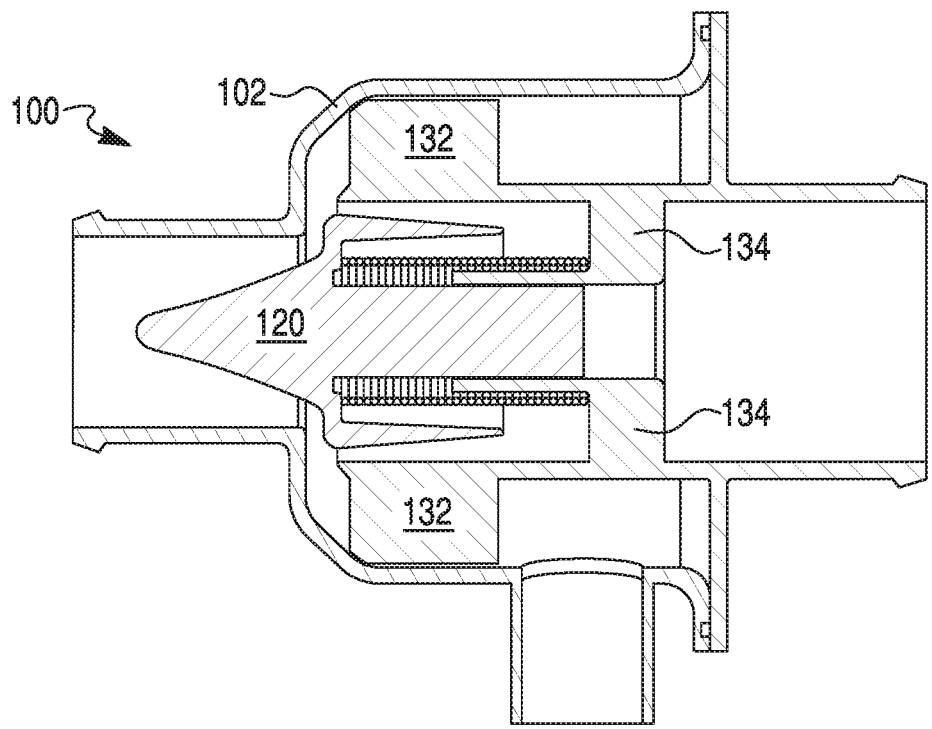
Figure 6:
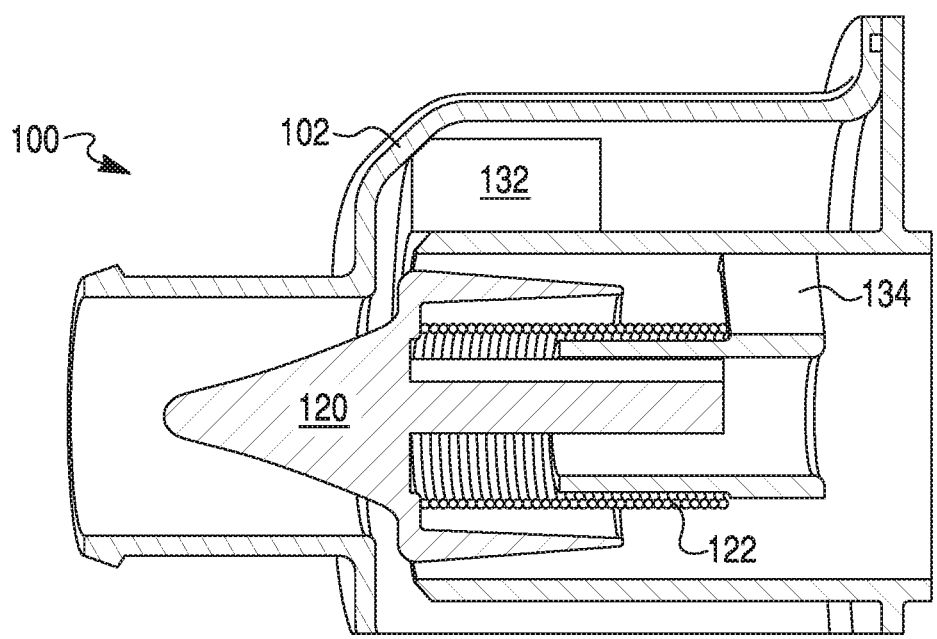

Referring to FIGS. 5 and 6, cross-sectional views of the inertial particle separator 100 are shown. As shown in FIGS. 5 and 6, the inner body 108 includes outer support ribs 132 and inner support ribs 134. The outer support ribs 132 support the central tube 112 against an inner surface of the housing 102. The outer support ribs 132 also center the central tube 112 within the housing 102. The inner support ribs 134 support and center the poppet support 118 within the central tube 112. In some arrangements the inner support ribs 134 provide a backing surface for the spring 122.

Referring to FIGS. 7, 8, 9, and 10 various views of the poppet 120 are shown. The poppet generally comprises a centering post 136 coupled to a skirt 138 and a conical top 140. The conical top 140 is formed by a rounded top 142 and a curved surface 144. The curved surface 144 connects to a radially projecting surface 146 that is generally perpendicular to the central axis 126. The radially projecting surface 146 is connected to the skirt 138. The rounded top 142, the curved surface 144, and the radially projecting surface 146 turns incoming air substantially perpendicular to the central axis 126. The shape of the conical top 140 reduces efficiency loss caused by large-particle bounce effects (i.e., for particles greater than 20 microns in diameter). In some arrangements, the centering post 136 has an X-shaped cross section such that the centering post 136 is received in slots of the poppet support 118 in a sliding manner. As shown best in FIG. 10, an outer surface of the skirt 138 may be arranged at an angle of 5-10 degrees with respect to an inner surface of the central tube 112. This angle creates a diffuser annulus channel between the central tube 112 and the skirt 138.

Referring to FIG. 11, a bottom view looking into the outlet 114 of the inertial particle separator 100. As shown in FIG. 11, the inner support ribs 134 support the poppet support 118, which receives the centering post 136.

Figure 12:
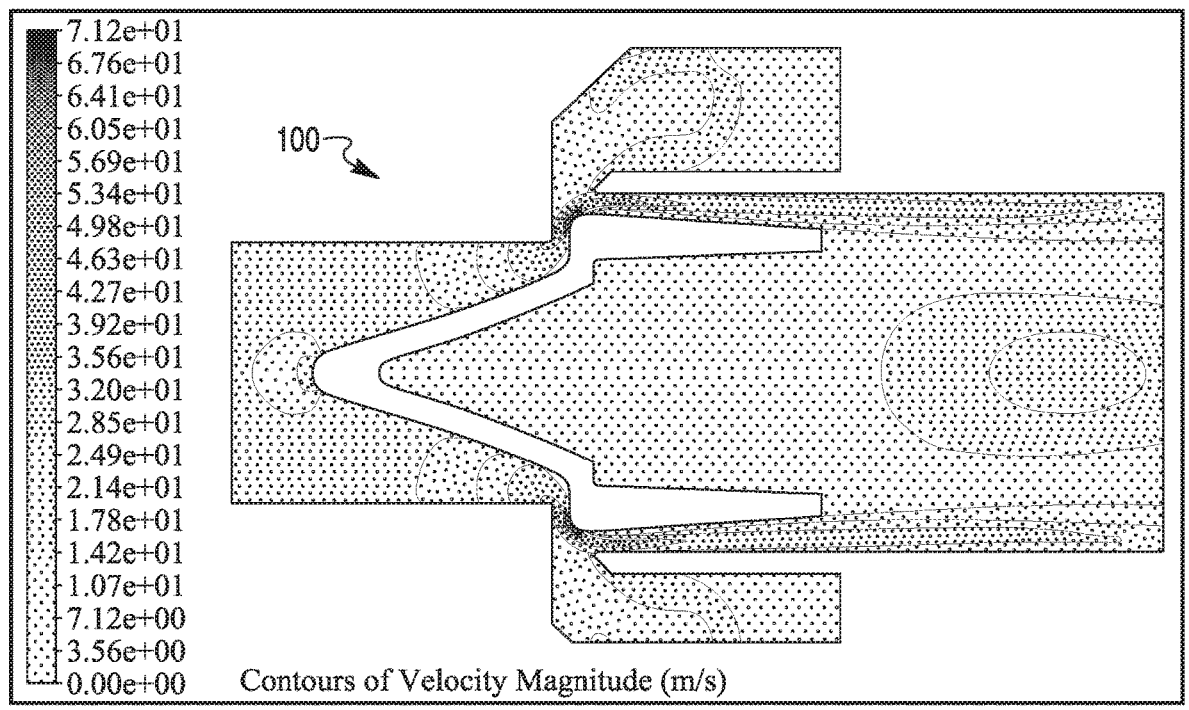
Figure 13:
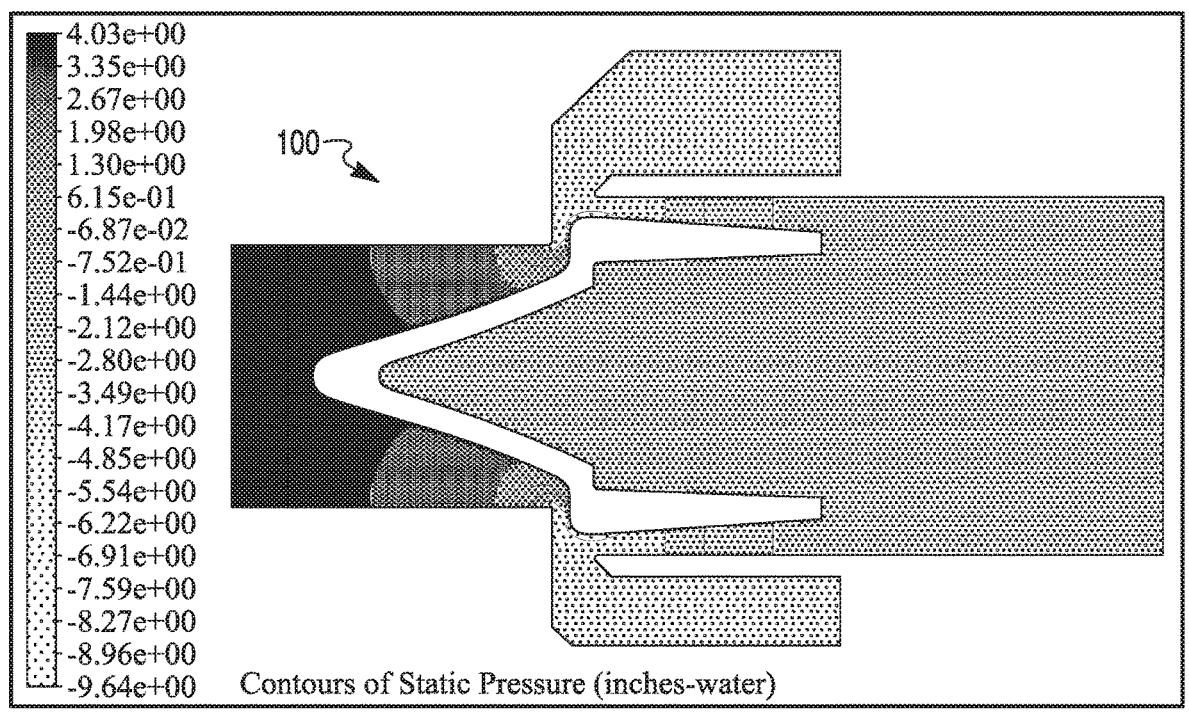
Figure 14:
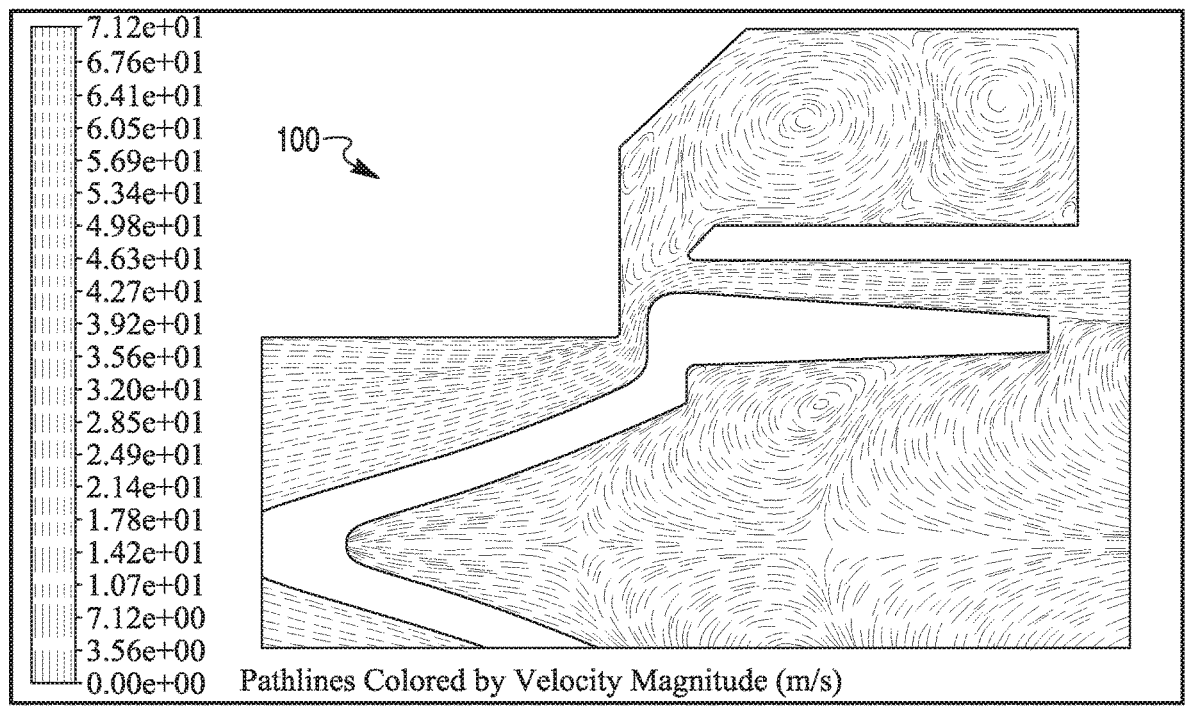
Figure 15:
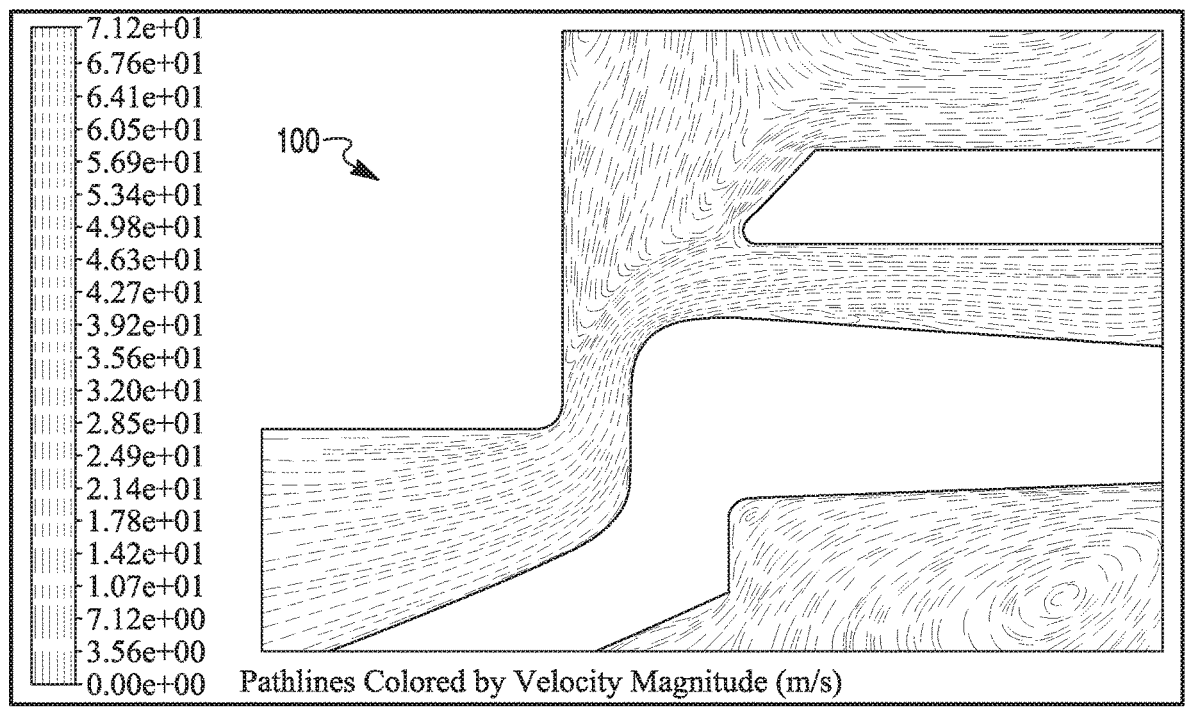
Figure 16:
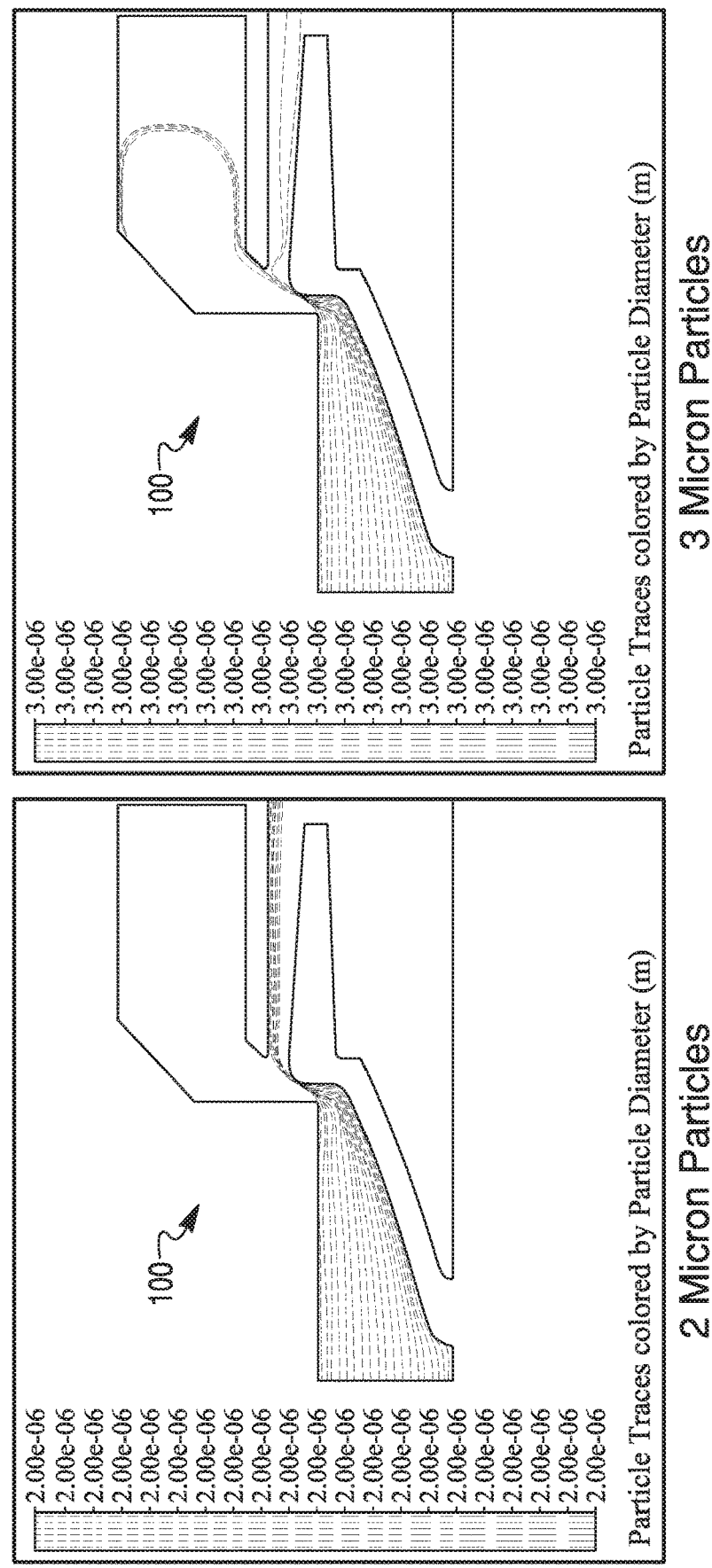
Figure 16:
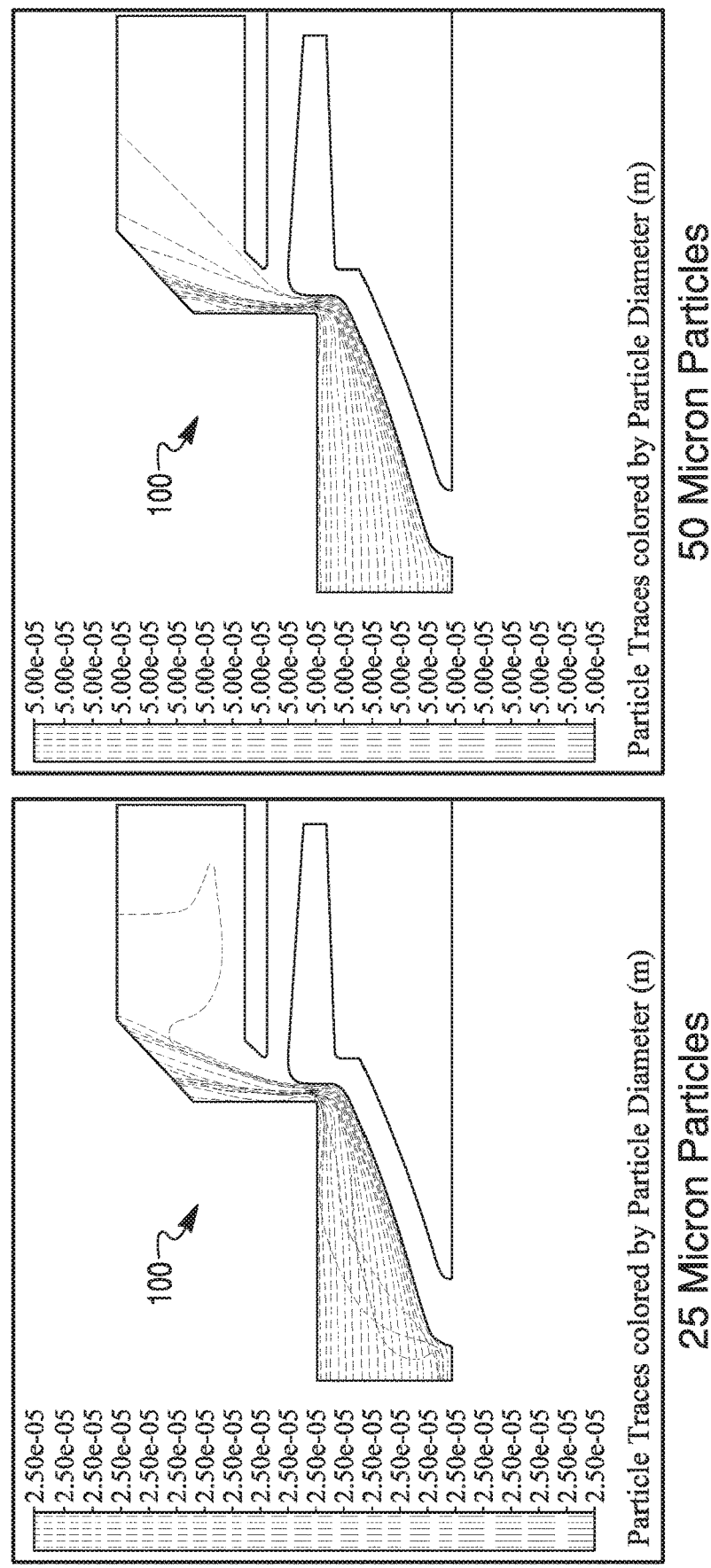

FIGS. 12 through 16 each show different plots of fluid flowing through the inertial particle separator 100. FIG. 12 shows a computational fluid dynamics (CFD) analysis showing the high velocity at the approximately 90° turn created at the poppet-seat interface, and the subsequent diffusion (gradual slowing) of velocity in the annulus skirt area which provides beneficial pressure recovery (lower dP). FIG. 13 shows a static pressure plot showing most of the dP occurring at the poppet-seat gap (e.g., approximately 4 in H2O in this case) and the recovery of some dynamic pressure in the skirt zone (i.e., rising pressure). FIG. 15 shows velocity pathlines, including the approximately 90° turn created at the poppet-seat interface, that create the conditions for particle inertial separation. FIG. 15 shows a close-up view of the velocity pathlines at the approximately 90° turn created at the poppet-seat interface. FIG. 16 shows six different particle trajectory plots of dust particles released at the inlet 104 at increasing particle sizes of 2, 3, 4, 5, 25, 50 micron showing that inertial particle separator 100 appears to have a cut size (i.e., 50% efficiency) of about 3 micron at an operating pressure drop of 1 kPa. The poppet 120 profile is designed to reflect and focus the bouncing particles radially.

Figure 17A:
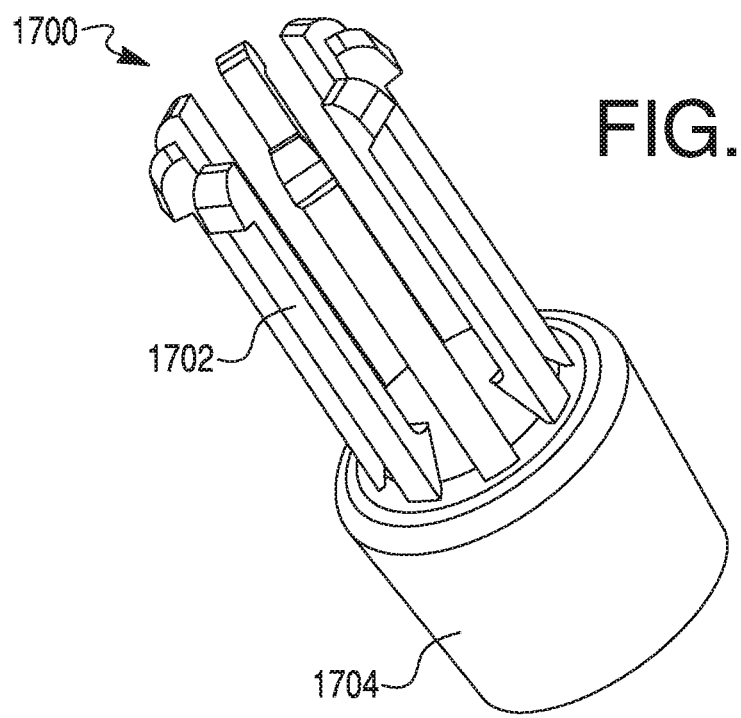
FIGS. 17A and 17B show different views of a poppet according to an example embodiment.
Figure 17B:
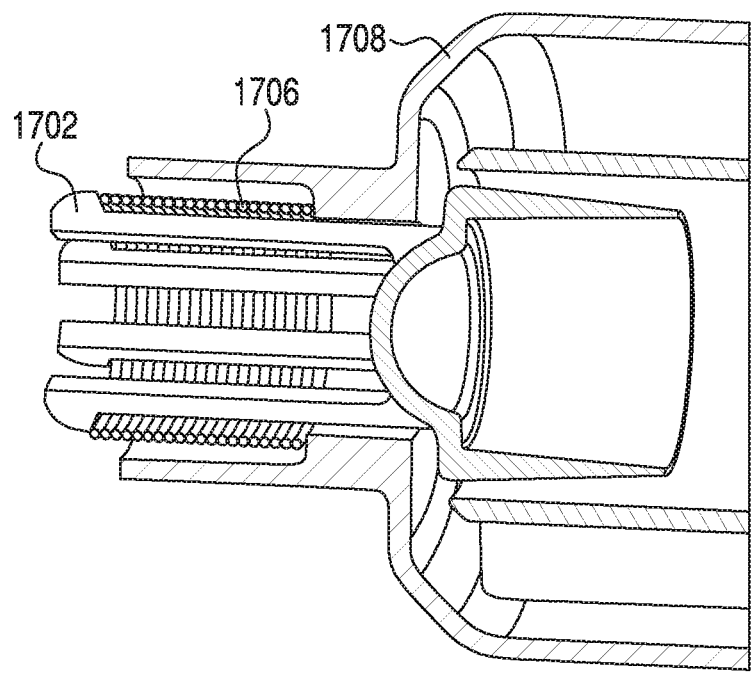

Referring to FIGS. 17A and 17B, views of a poppet 1700 are shown according to an example embodiment. The poppet 1700, for example, may be used in place of the poppet 120 of the inertial particle separator 100 or another similar inertial separator system. FIG. 17A shows a perspective view of the poppet 1700. FIG. 17B shows a cross-sectional view of the poppet 1700 installed in an inertial separator system. The poppet 1700 is similar to the poppet 120. The poppet 1700 generally comprises a main body 1704 and a plurality of circumferentially arranged legs 1702 extending from a top surface of the main body 1704. While the legs 1702 are extending away from the main body 1704 towards the inlet 104, in some embodiments, the legs 1702 extend from the main body 1704 away from the inlet 104. In some arrangements, the legs 1702 are snap-fit legs. The legs 1702 are configured to secure a spring 1706 against a housing 1708 when the poppet 1700 is installed in an inertial separator system (e.g., as shown in FIG. 17B). In some embodiments, the spring 1706 is disposed within the central tube 112. The legs 1702 and the spring 1706 center the poppet 1700 within the housing 1708 and provide the biasing force against the poppet 1700 in the same manner as described above with respect to the poppet 120 and the spring 122.

Figure 18A:
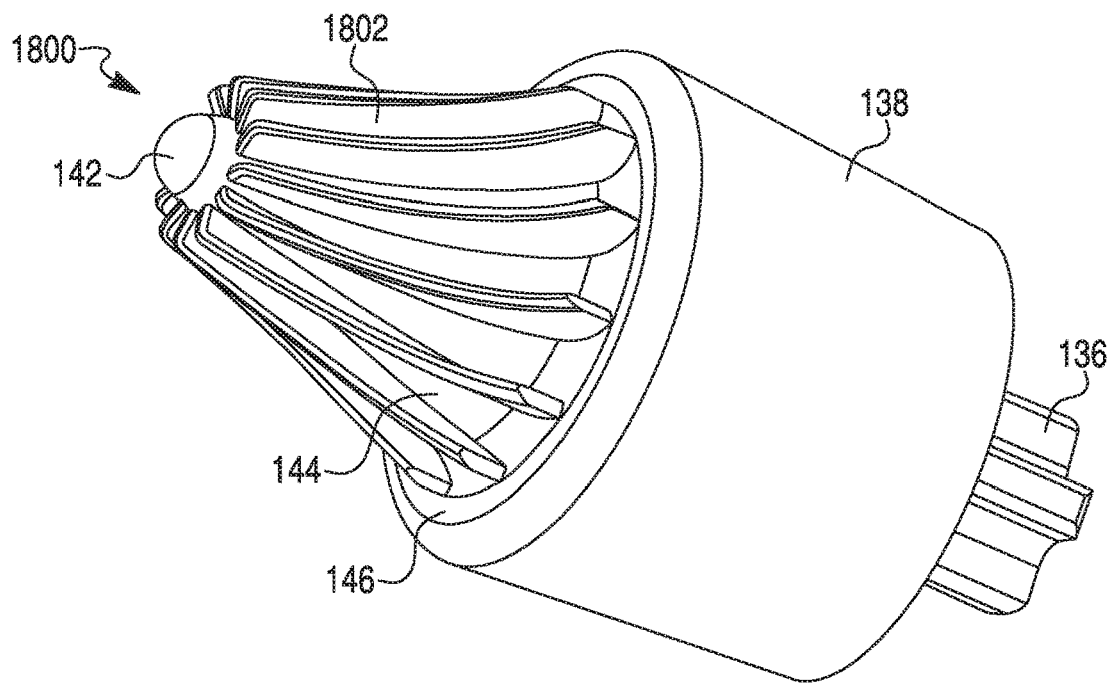
Figure 18B:
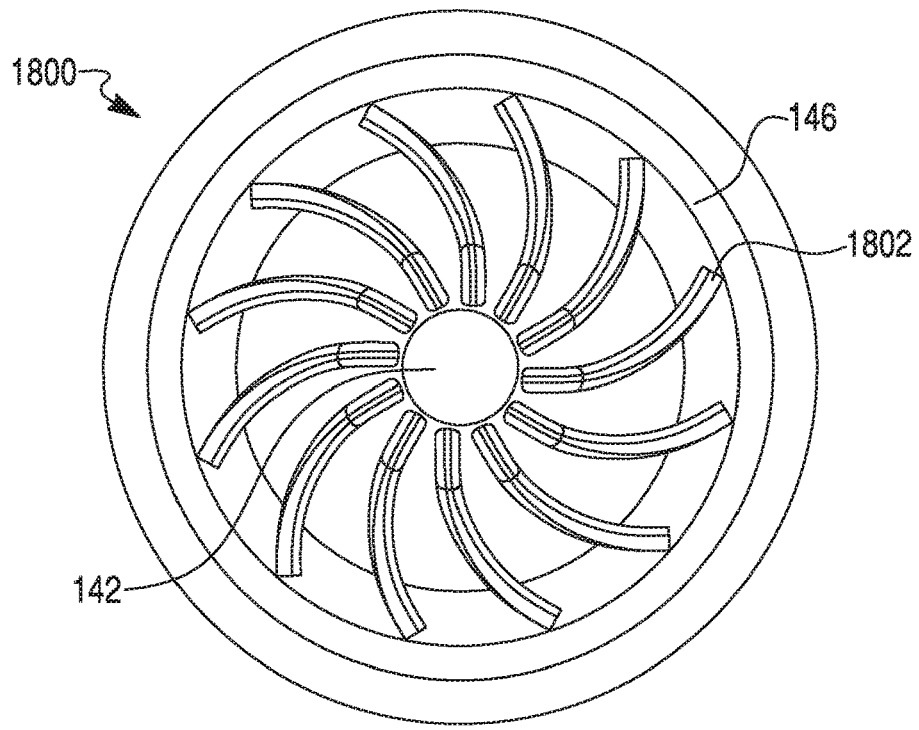
Figure 18E:
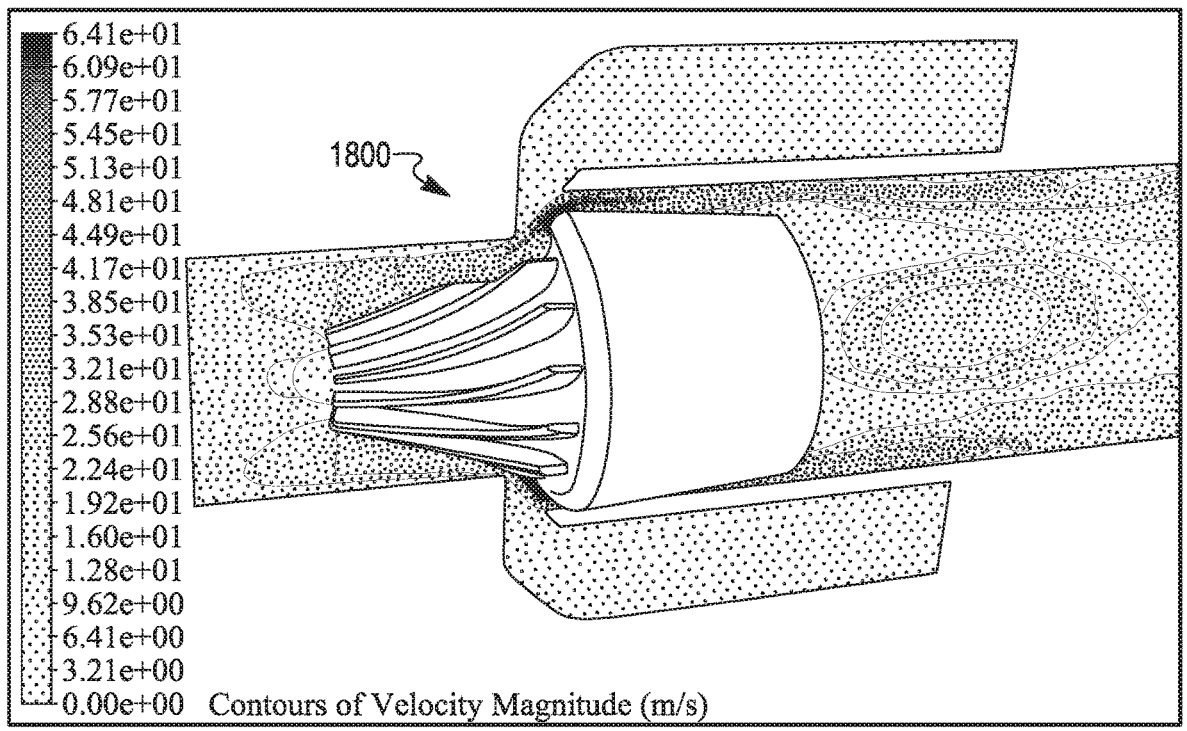
Figure 18F:
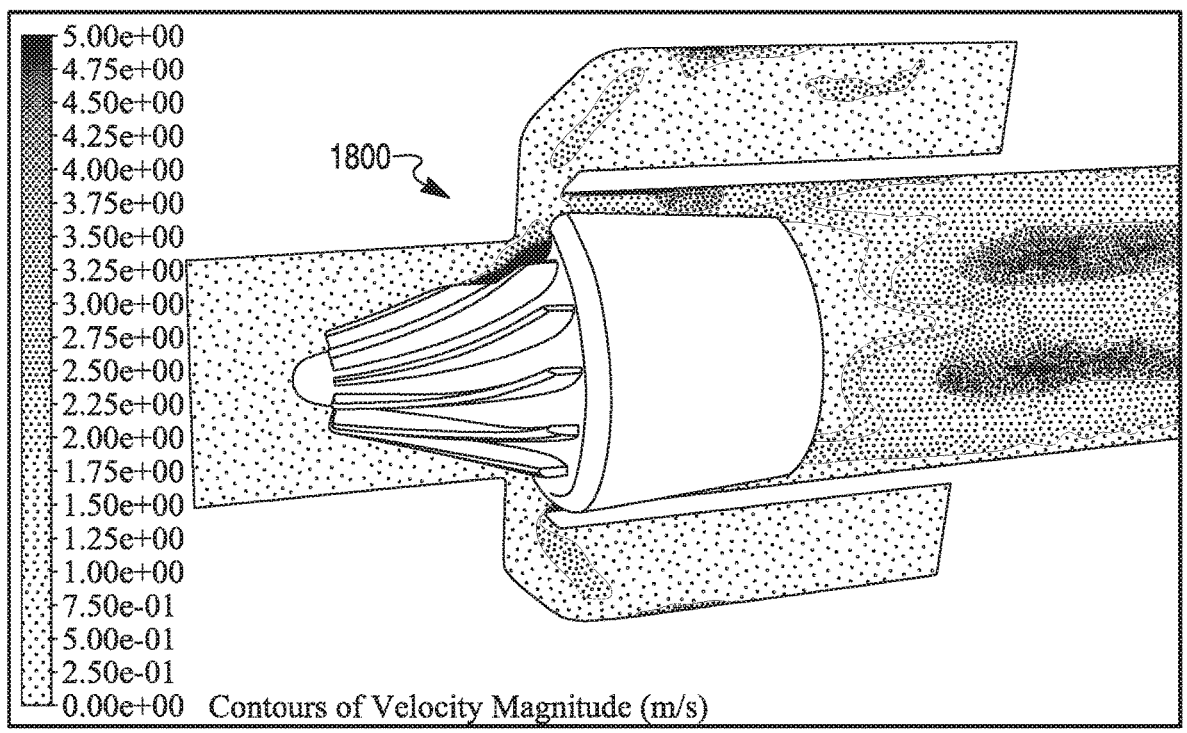

Referring to FIGS. 18A through 18F, views of a poppet 1800 are shown according to another example embodiment. The poppet 1800 is substantially the same as the poppet 120. The poppet 1800 may be installed in the inertial particle separator 100 in place of the poppet 120. A difference between the poppet 1800 and the poppet 120 is the poppet 1800 includes axially projecting swirl fins 1802 according to another example embodiment. Accordingly, like numbering is used in describing the poppet 120 and the poppet 1800. FIGS. 18A and 18B each show a different perspective view of the poppet 1800. FIG. 18C shows the poppet 1800 installed in the inertial particle separator 100. FIGS. 18D, 18E, and 18F each show a different flow diagram showing the flow of fluid through the inertial particle separator 100 having the poppet 1800 installed therein. The axially projecting swirl fins 1802 impart some amount of tangential velocity (i.e., swirl) to the airflow (and particles) passing through the inertial particle separator 100, just prior to entering a radial virtual-impaction zone. The swirl creates a centrifugal force component that assists in moving particles that are near the poppet surface radially outwards towards the a more favorable "outer lane" of curvature before the sharp turn upstream of the outlet 114 thereby increasing the separation efficiency of the inertial particle separator 100. Additionally, the swirling flow may drive a beneficial secondary flow in dust radial discharge zone 130, which helps to reduce particle reentrainment from the dust radial discharge zone 130 into the central tube 112.

Figure 19A:
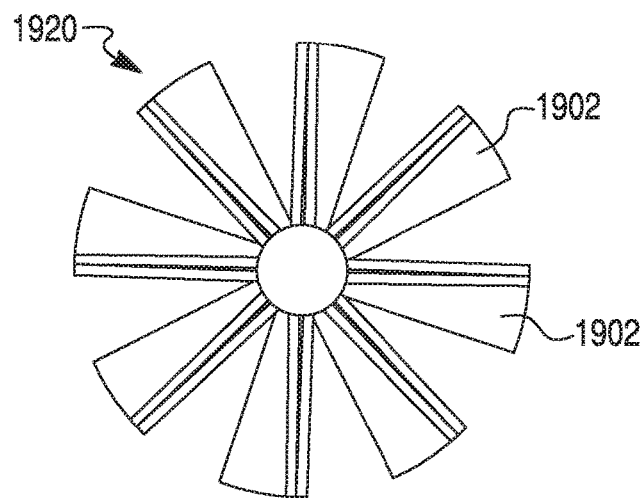
FIGS. 19A through 19G, show different views of an inertial particle separator according to a further example embodiment.
Figure 19B:
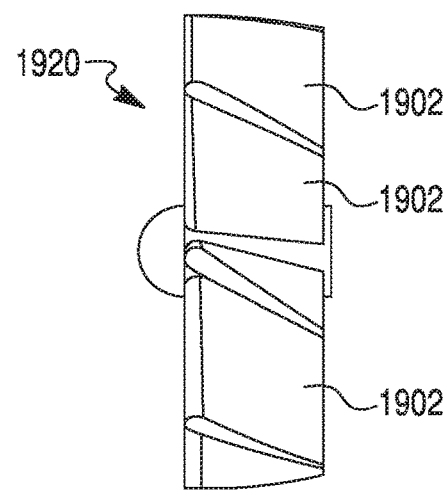
Figure 19C:
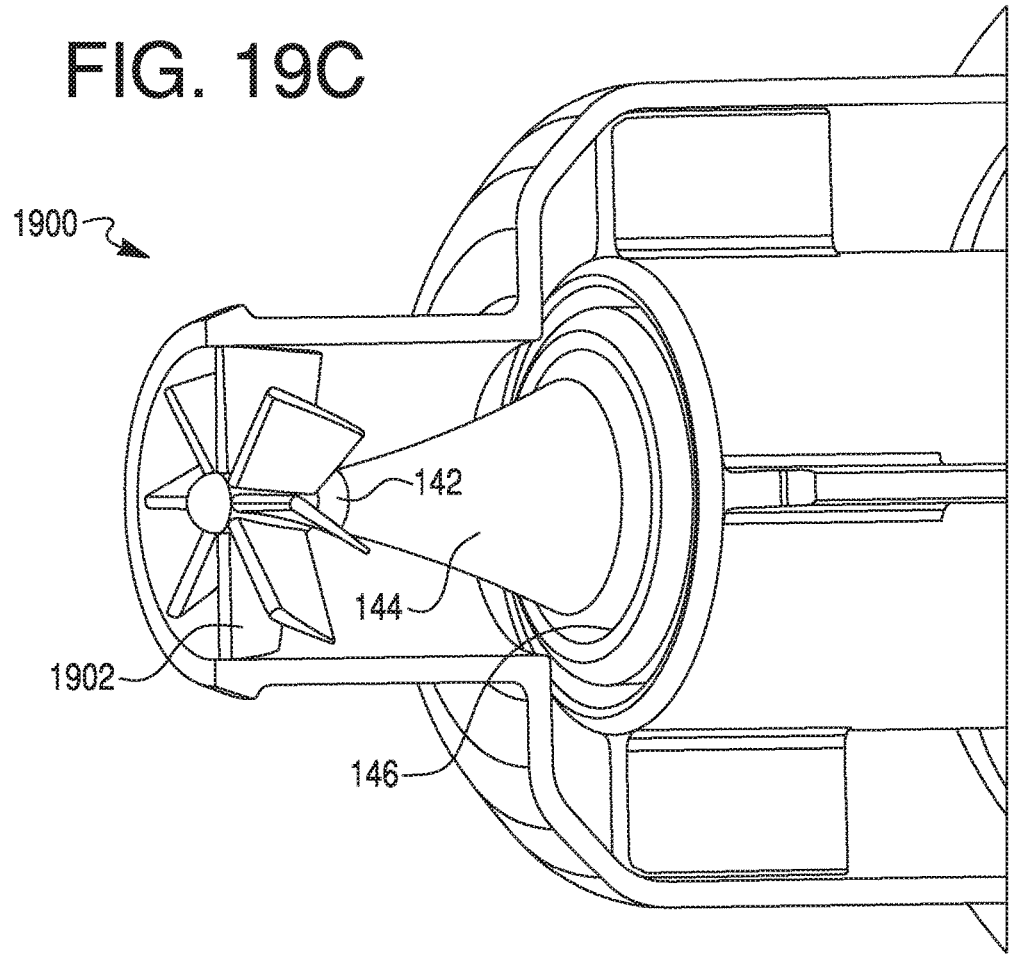
Figure 19D:
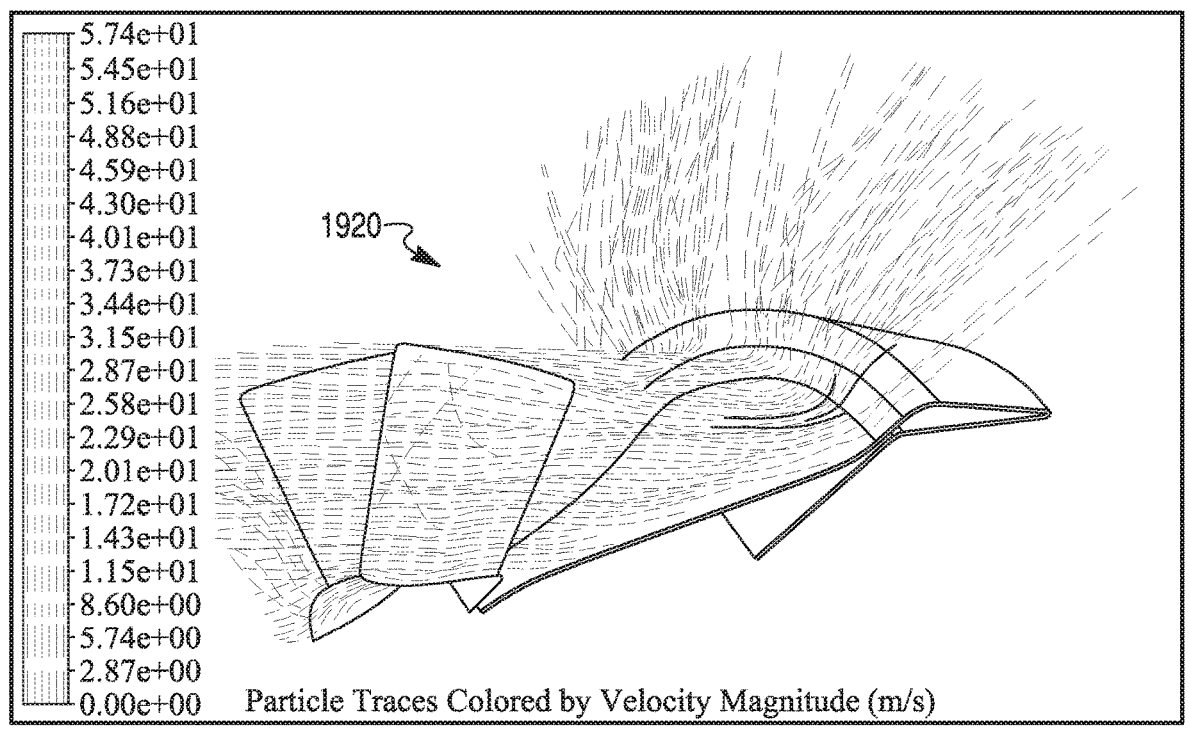
Figure 19E:
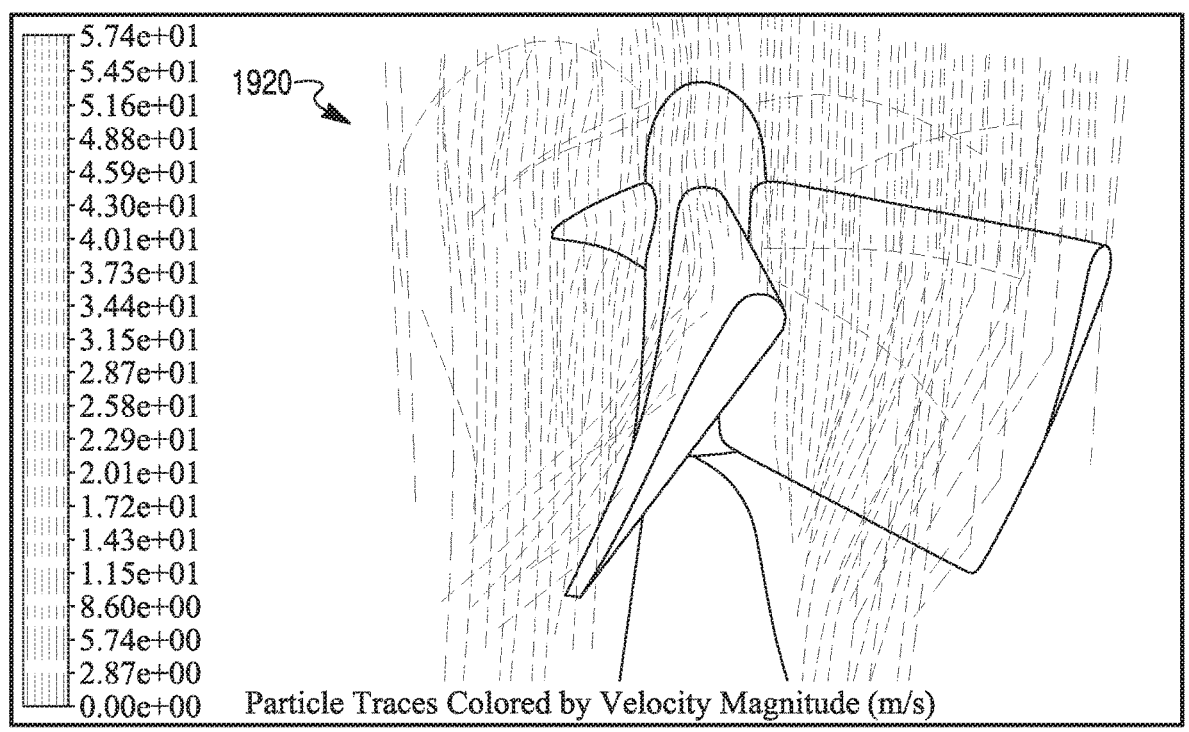
Figure 19F:
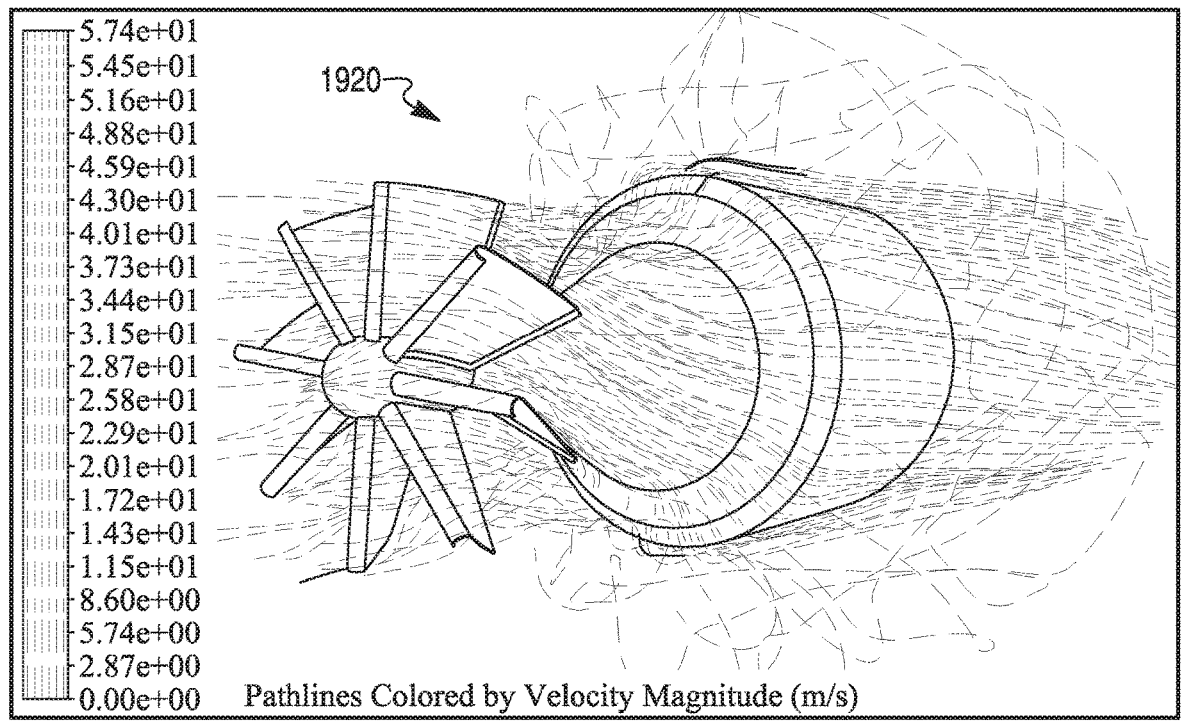
Figure 19G:
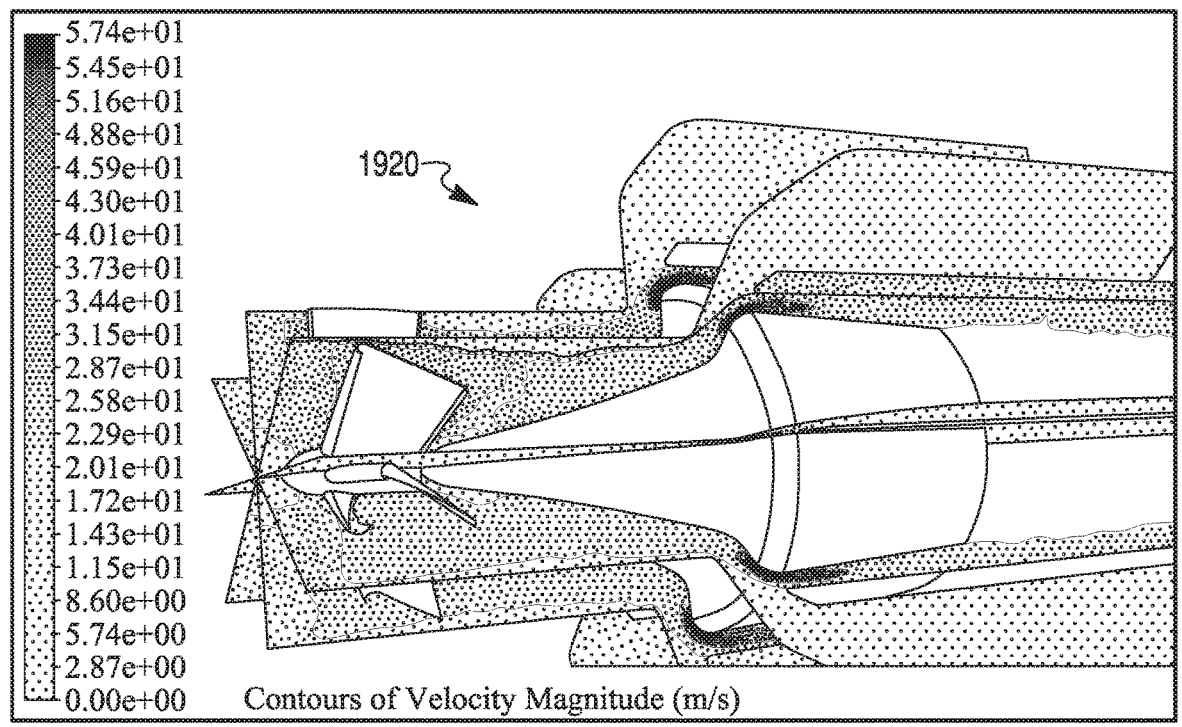

Referring to FIGS. 19A through 19G, views of an inertial particle separator 1900 are shown according to a further example embodiment. The inertial particle separator 1900 is substantially similar to the inertial particle separator 100. A difference between the inertial particle separator 1900 and the inertial particle separator 100 is that the inertial particle separator 1900 includes pre-swirl vanes 1902 affixed or molded integrally with the inlet 104 of the housing 102. Accordingly, like numbering is used in describing the inertial particle separator 100 and the inertial particle separator 1900. FIGS. 19A and 19B show different perspective views of the pre-swirl vanes 1902. FIG. 19C shows a cross-sectional view of the inertial particle separator 1900. FIGS. 19D, 19E, 19F, and 19G show different flow diagrams showing flow through the inertial particle separator 1900. The pre-swirl vanes 1902 are positioned upstream of the poppet 1920 in the inlet 104. The pre-swirl vanes 1902 may be integrally molded or attached to the inner surface of the inlet 104. The pre-swirl vanes 1902 impart some amount of tangential velocity (i.e., swirl) to the airflow (and particles) passing through the inertial particle separator 100, just prior to entering a radial virtual-impaction zone. The swirl creates a centrifugal force component that assists in moving particles that are near the poppet 1920 surface radially outwards towards the a more favorable "outer lane" of curvature before the sharp turn upstream of the outlet 114 thereby increasing the separation efficiency of the inertial particle separator 100. Additionally, the swirling flow may drive a beneficial secondary flow in dust radial discharge zone 130, which helps to reduce particle reentrainment from the dust radial discharge zone 130 into the central tube 112.

Figure 20A:
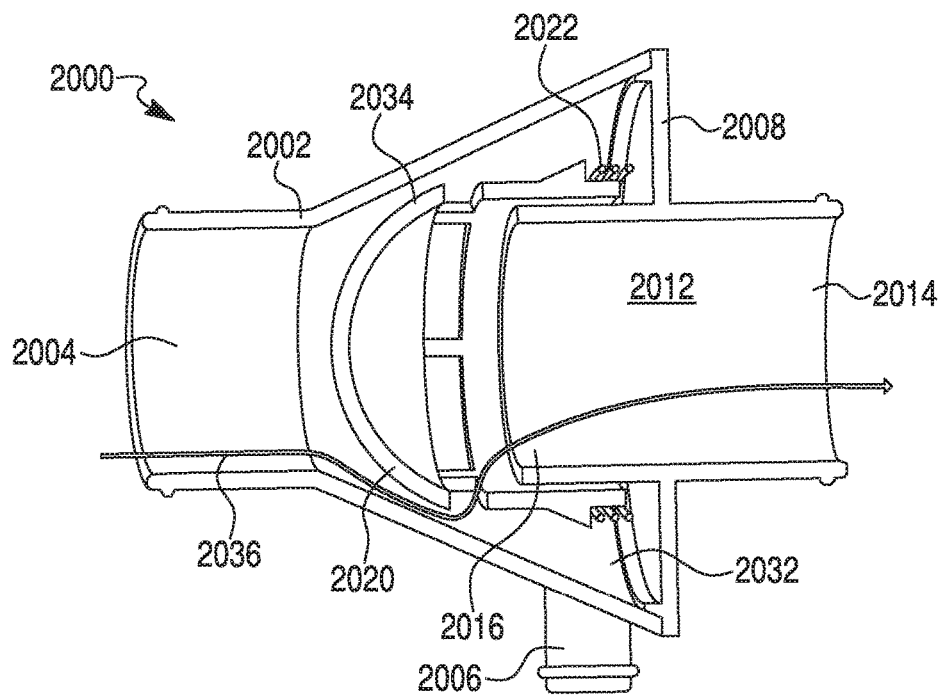
FIGS. 20A and 20F show different views of an inertial particle separator according to an example embodiment.
Figure 20B:
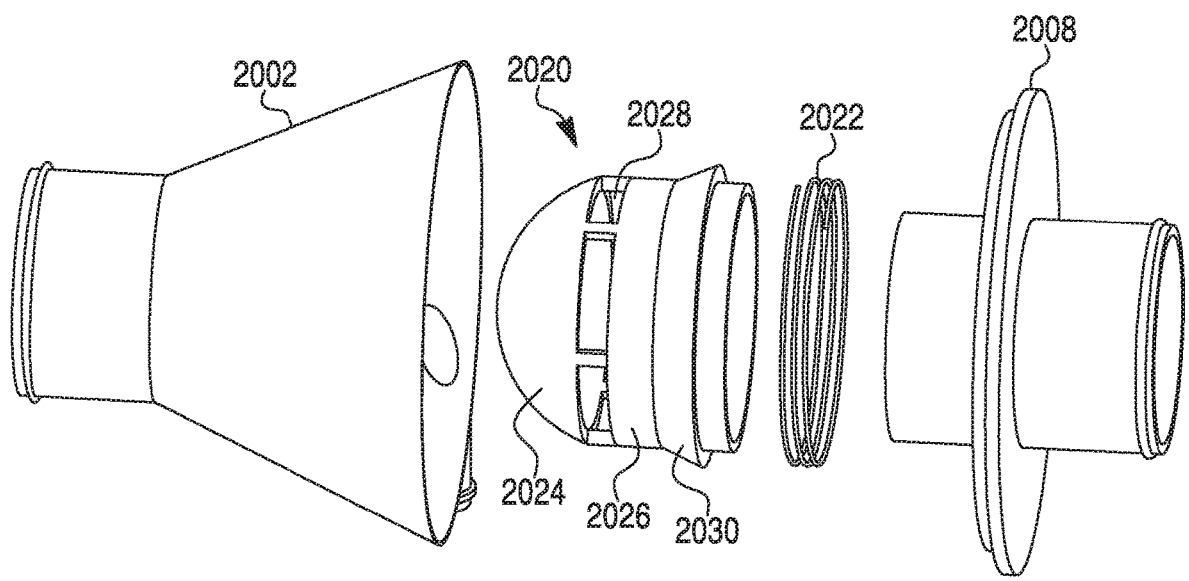

Referring to FIGS. 20A and 20B, views of an inertial particle separator 2000 are shown according to an example embodiment. FIG. 20A shows a cross-sectional view of the inertial particle separator 2000. FIG. 20B shows an exploded view of the inertial particle separator 2000. The inertial particle separator generally includes a housing 2002 having an inlet 2004 and a dust port 2006. In some arrangements, the dust port 2006 is fitted with a dust ejection valve, such as a rubber duckbill valve. The housing 2002 is removably coupled to an inner body 2008.

In some arrangements, the housing 2002 presses a seal member against a surface of the inner body 2008. The inner body 2008 comprises a central tube 2012 that includes an outlet portion 2014 extending away from the housing 2002 and an inlet portion 2016 extending into a central compartment defined by the housing 2002. A poppet 2020 is fitted over an outer surface of the central tube 2012 and positioned within the central compartment defined by the housing 2002. The poppet 2020 is axially movable with respect to the central tube 2012 along an axis defined by a central axis of the central tube 2012. The poppet 2020 is movable between a closed position (not shown; pressed against an inner surface of the housing 2002) and an open position (as shown in FIG. 20A). The poppet 2020 is biased towards the closed position by a spring 2022 coupled to the poppet 2020 and the inner body 2008. The poppet 2020 comprises a domed portion 2024, a cylindrical portion 2026 having a plurality of circumferential inlets 2028, and an angled skirt portion 2030 (as shown in FIG. 20B). The angled skirt portion 2030 extends outwardly from an outer surface of the cylindrical portion 2026. The angled skirt portion 2030 forms a contact surface for the spring 2022. The space between the housing 2002 and the inner body 2008 downstream of the circumferential inlets 2028 defines a dust collection area 2032. The space between the inner wall of the housing 2002 and the outer surface of the domed portion 2024 of the poppet 2020 defines a nozzle 2034.

During operation, the poppet 2020 is biased towards the inner surface of the housing 2002. When the poppet 2020 is pressed against the inner surface of the housing 2002, the opening of the nozzle 2034 is reduced to zero. When air is flowing through the inertial particle separator 2000 (e.g., along the flow line 2036 as shown in FIG. 20A), the air pressure against the domed portion 2024 causes the poppet 2020 to compress the spring 2022 and cause the nozzle 2034 to open. The air flow then makes a sharp turn through the circumferential inlets 2028 causing entrained dust to fall into the dust collection area 2032. The air then proceeds through the central tube 2012 and out the outlet 2014 portion (e.g., and on to an internal combustion engine, an air filter, etc.). The arrangement of the inertial particle separator 2000 causes the size of the nozzle 2034 and dust collection volume entrance to increase with increased air flow through the inertial particle separator 2000.

Figure 20E:
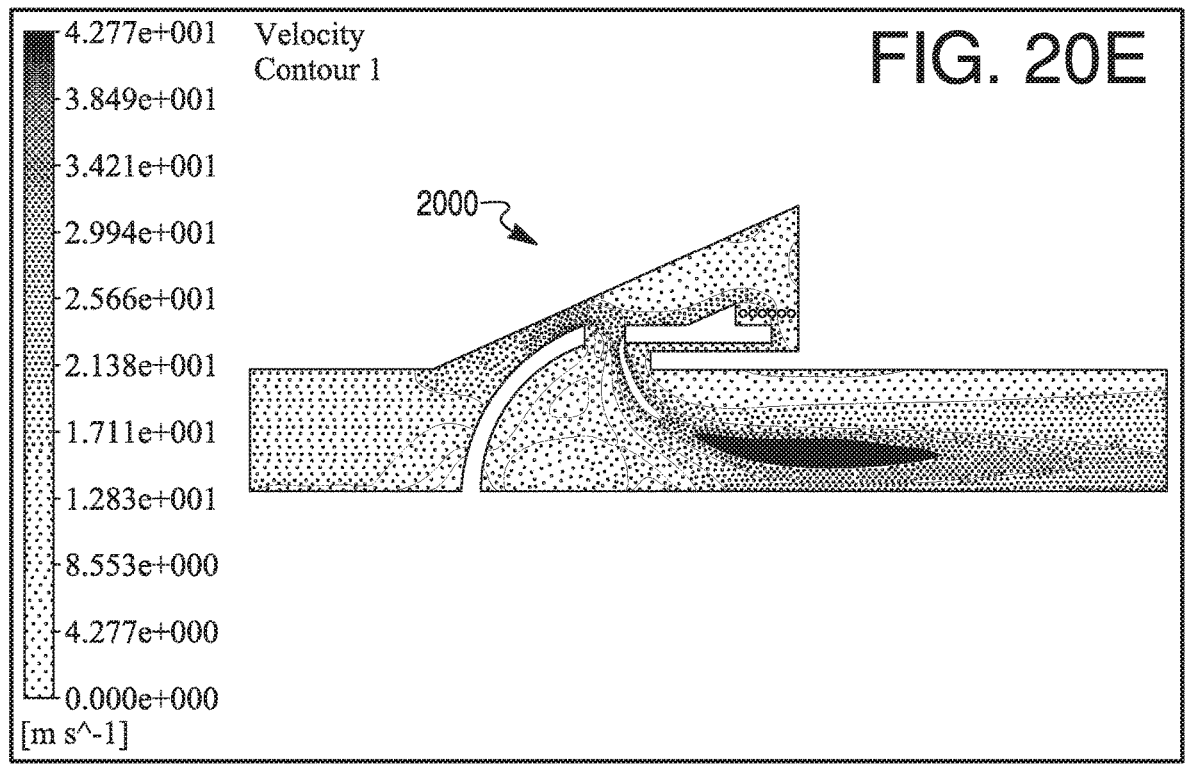
Figure 20F:
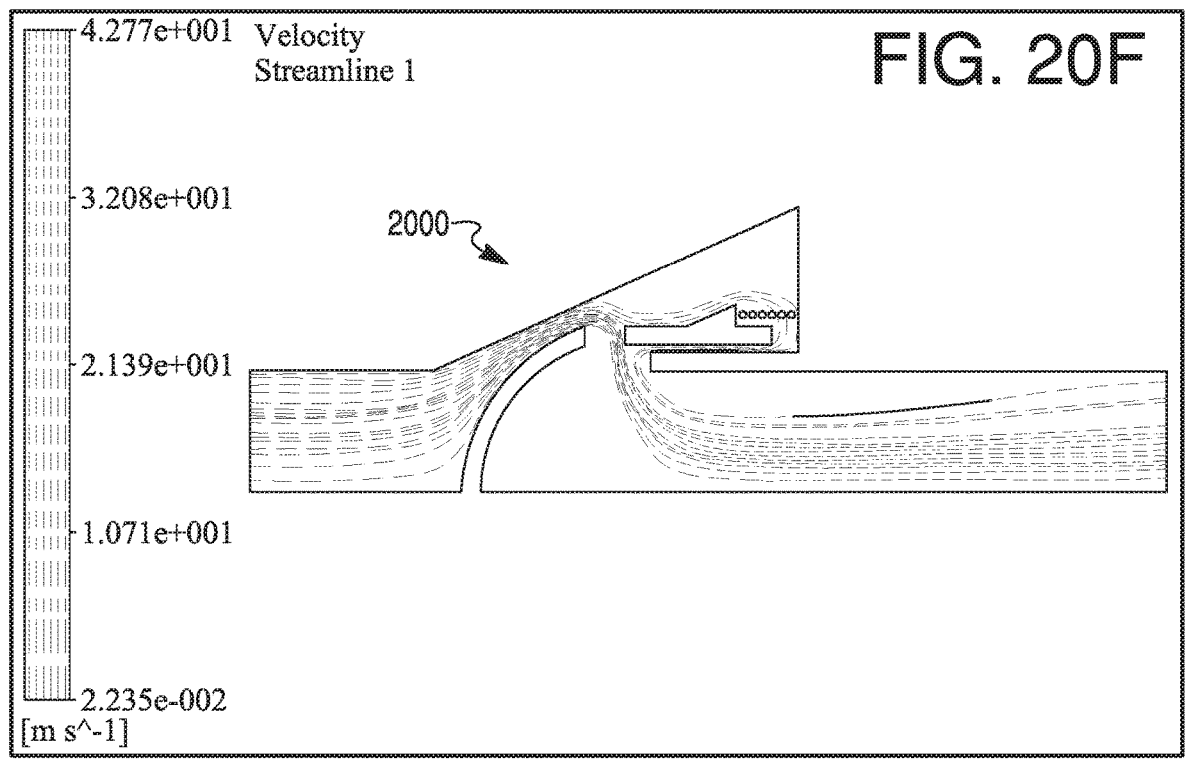

Referring to FIGS. 20C, 20D, 20E, and 20F, flow diagrams of fluid flowing through the inertial particle separator 2000 are shown. FIG. 20C shows particle dust track of the angled outer body design showing a particle cut size near 4 microns. In FIG. 20C, larger particles are retained in the dust collection volume while smaller particles are more likely to follow the flow path. FIG. 20D shows a pressure contour map of the inertial particle separator 2000. The average differential pressure between the outlet and inlet of the inertial particle separator is about 1 kPa. FIG. 20E shows a velocity contour map of the inertial particle separator 2000. As shown the flow tends to have its highest velocity in the nozzle region and just after the sharp turn downstream of the nozzle. FIG. 20F shows velocity streamlines of the inertial particle separator 2000. As shown, very little flow enters the dust collection volume.

Figure 21A:
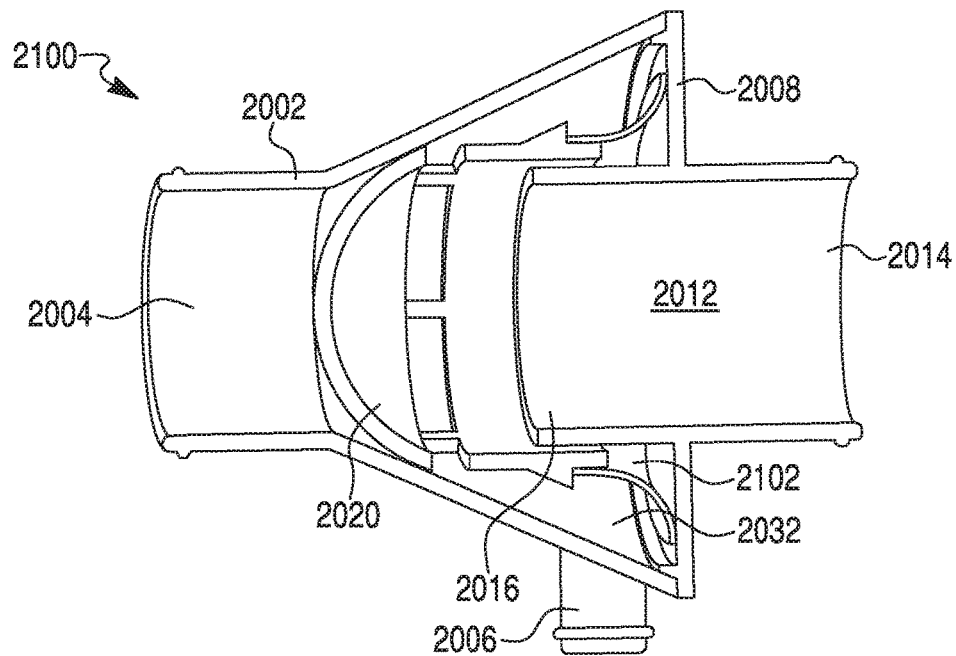
FIGS. 21A through 21D show views of an inertial particle separator according to an example embodiment.
Figure 21B:
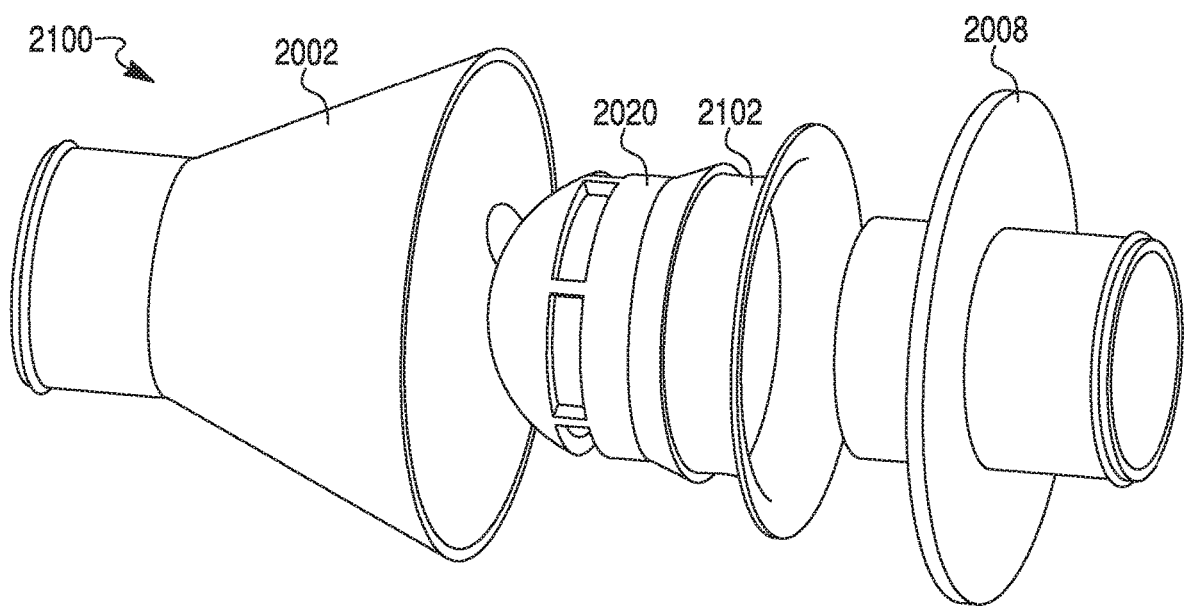
Figure 21C:
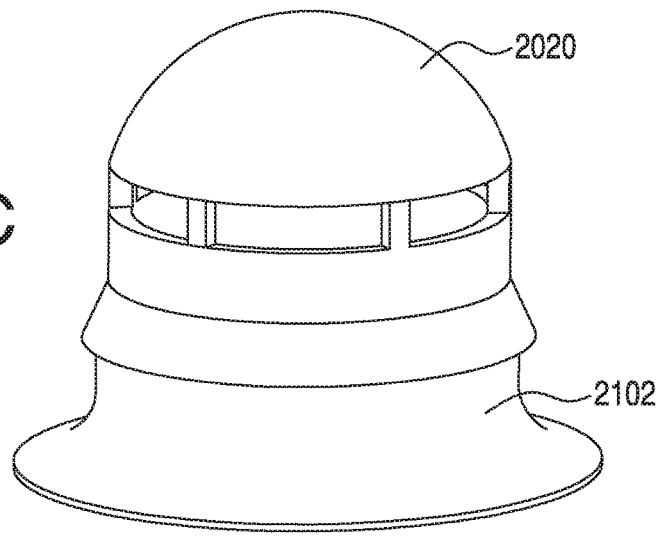
Figure 21D:
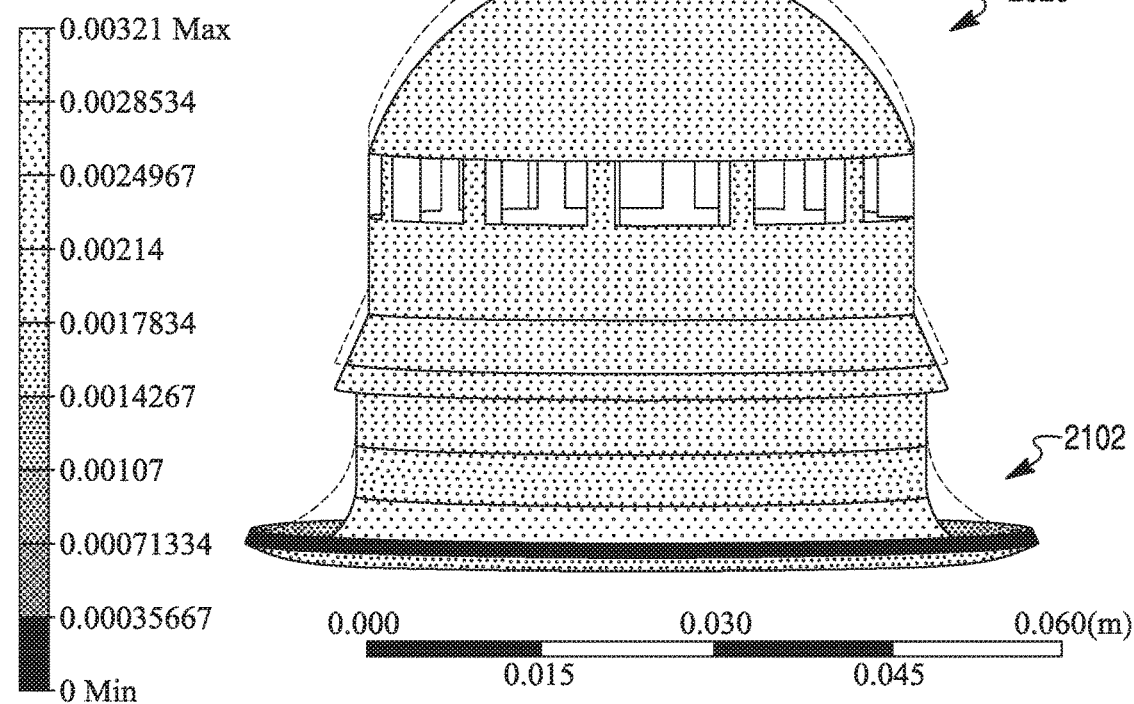

Referring to FIGS. 21A through 21D, views of an inertial particle separator 2100 are shown according to an example embodiment. FIG. 21A shows a cross sectional view of the inertial particle separator 2100. FIG. 21B shows an exploded view of the inertial particle separator 2100. FIG. 21C shows the poppet 2020 and skirt 2102 assembled. FIG. 21D shows a finite element analysis of skirt 2102 and poppet 2020 assembly under 1 kPa of pressure, which demonstrates about 2 mm of displacement at the poppet 2020. The inertial particle separator 2100 is substantially similar to the inertial particle separator 2000. The only difference between the inertial particle separator 2100 and the inertial particle separator 2000 is that the inertial particle separator 2100 utilizes a skirt 2102 instead of the spring 2022. Accordingly, like numbering is used in describing the inertial particle separator 2100 and the inertial particle separator 2000 where like parts are designated. In some arrangements, the skirt 2102 is comprised of rubber. In addition to providing the biasing force against the poppet 2020, the skirt 2102 also provides a barrier to prevent potential reentrainment that can occur between the poppet 2020 and the dust collection area 2032.

Figure 22A:
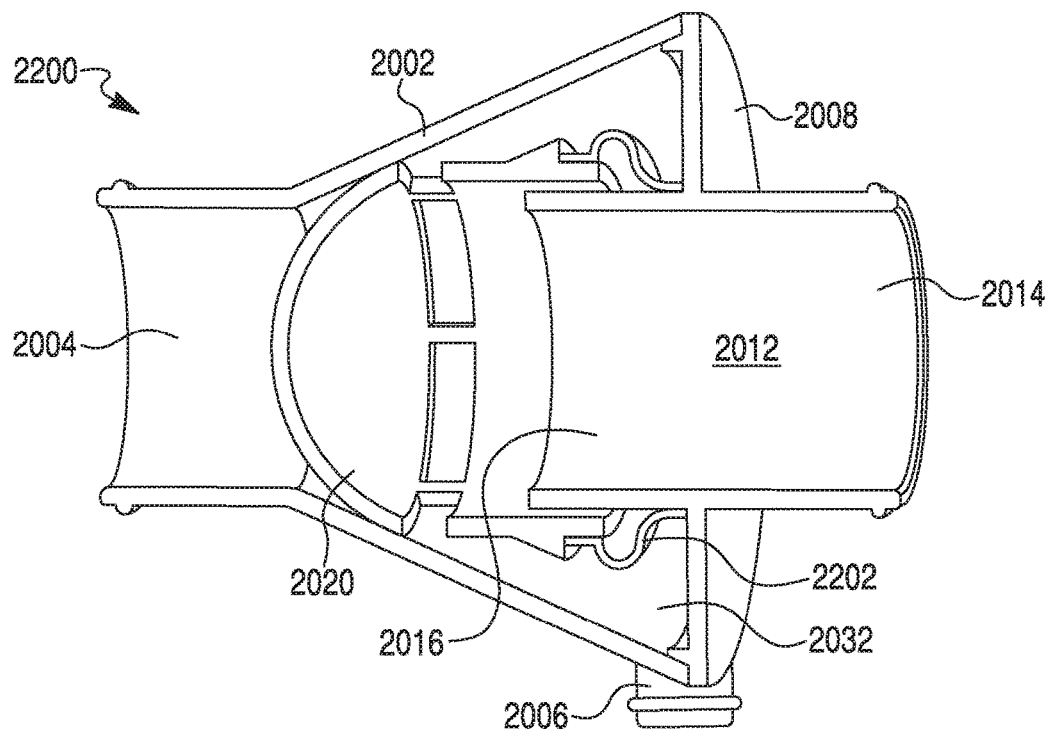
FIGS. 22A through 22D show views of an inertial particle separator according to a further example embodiment.
Figure 22B:
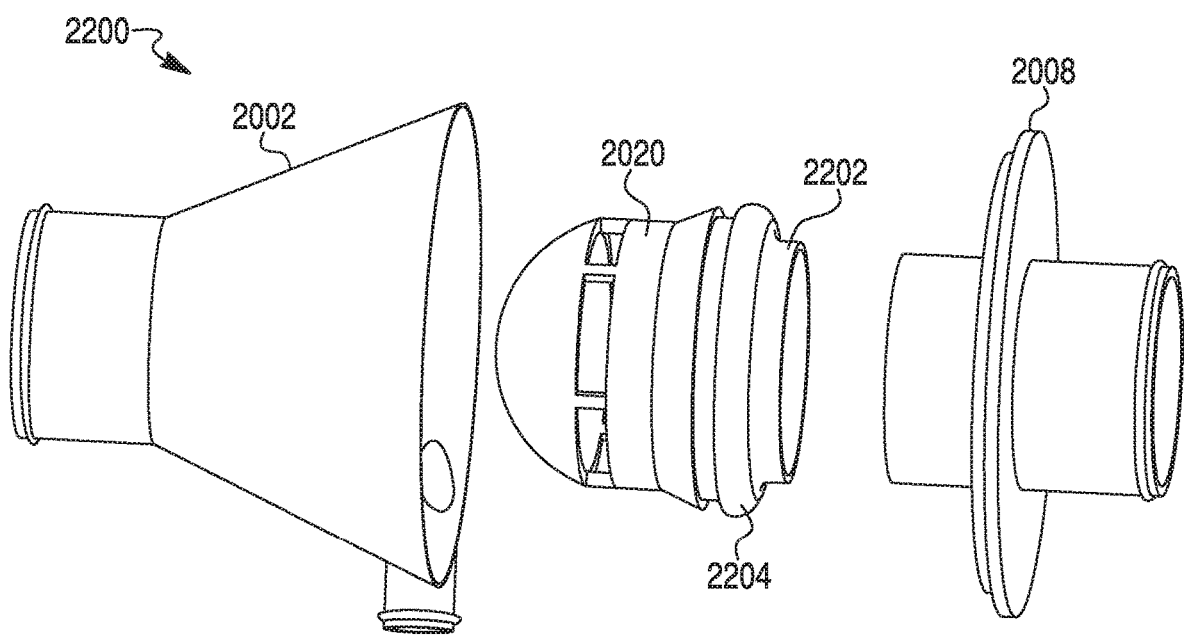
Figure 22C:
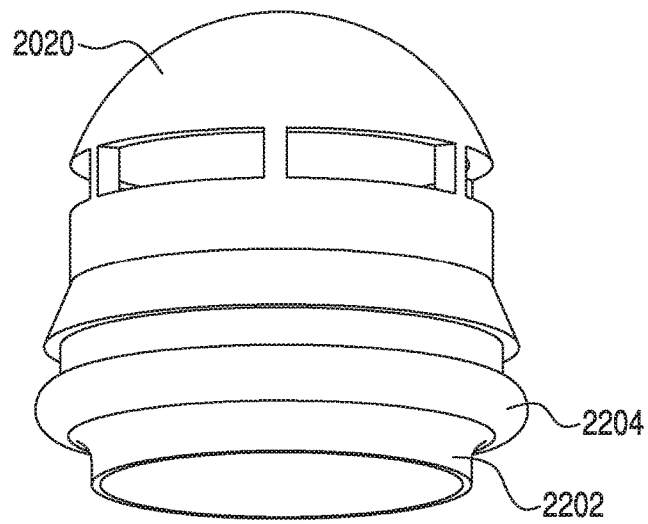
Figure 22D:
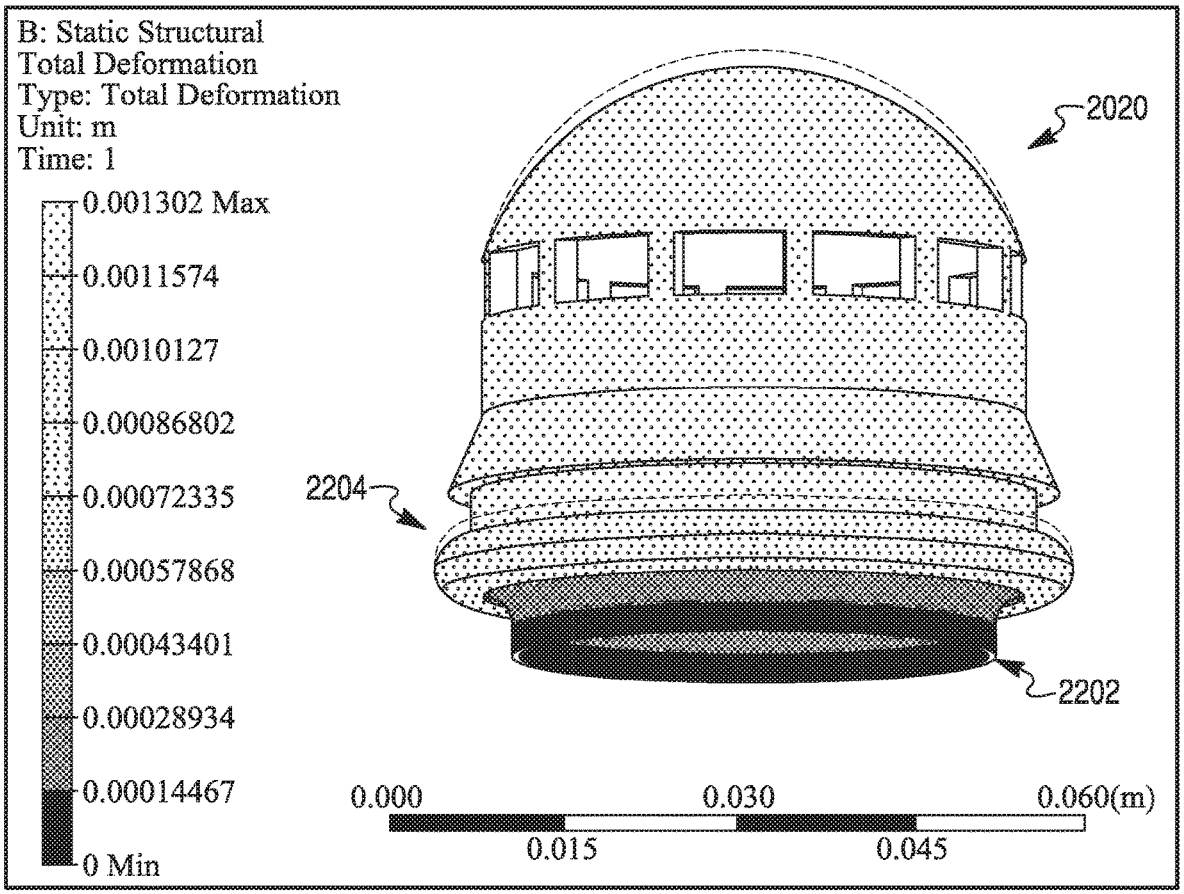

Referring to FIGS. 22A through 22D, views of an inertial particle separator 2200 are shown according to an example embodiment. FIG. 22A shows a cross sectional view of the inertial particle separator 2200. FIG. 22B shows an exploded view of the inertial particle separator 2200. FIG. 22C shows the poppet 2020 and skirt 2202 assembled. FIG. 22D shows a finite element analysis of skirt 2202 and poppet 2020 assembly under 1 kPa of pressure, which demonstrates about 1.3 mm of displacement at the poppet 2020. The inertial particle separator 2200 is substantially similar to the inertial particle separator 2100. The only difference between the inertial particle separator 2200 and the inertial particle separator 2100 is that the inertial particle separator 2200 utilizes a skirt 2202 having a different shape than the skirt 2102. Accordingly, like numbering is used in describing the inertial particle separator 2200 and the inertial particle separator 2100 where like parts are designated. In some arrangements, the skirt 2202 is comprised of rubber. The skirt 2202 is concentrically tangent with respect the outer wall of the central tube 2012. In addition to providing the biasing force against the poppet 2020, the skirt 2202 also provides a barrier to prevent potential reentrainment that can occur between the poppet 2020 and the dust collection area 2032. Compared to the skirt 2102, the bulge 2204 of the skirt 2202 may act as an extra barrier to prevent potential reentrainment.

Figure 23A:
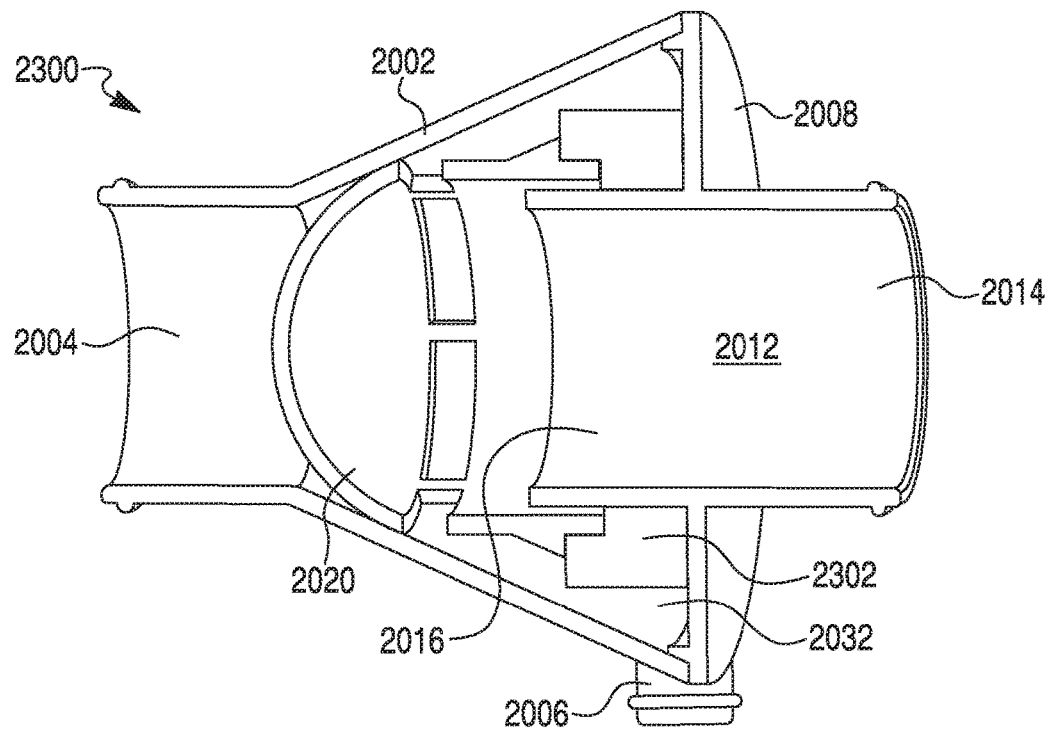
FIGS. 23A and 23B show views of an inertial particle separator according to an additional example embodiment.
Figure 23B:
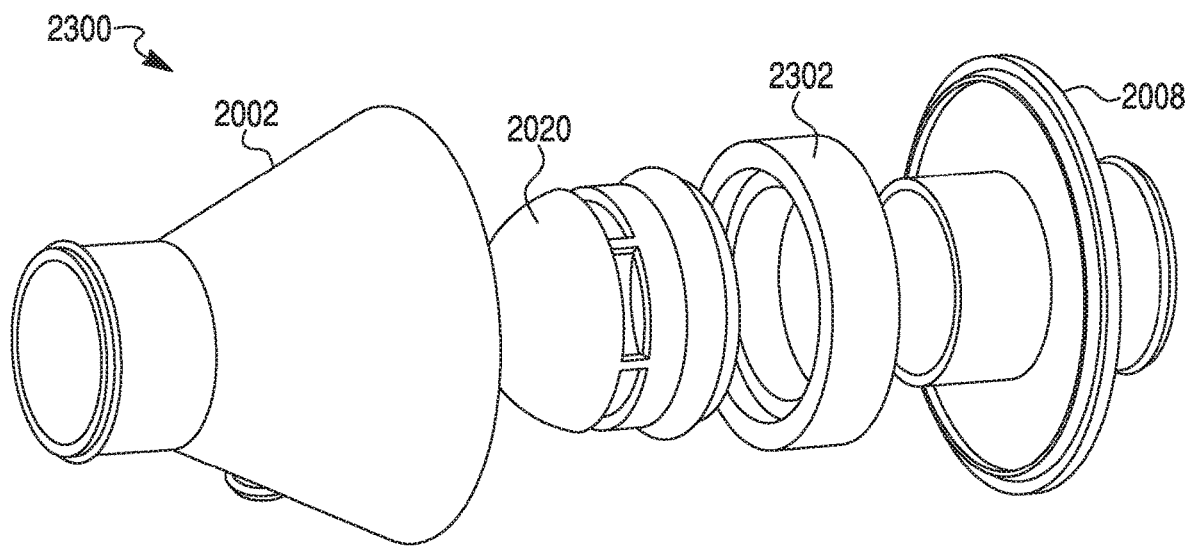

Referring to FIGS. 23A and 23B, views of an inertial particle separator 2300 are shown according to an example embodiment. FIG. 23A shows a cross-sectional view of the inertial particle separator 2300. FIG. 23B shows an exploded view of the inertial particle separator 2300. The inertial particle separator 2300 is similar to the inertial particle separator 2000. The only difference between the inertial particle separator 2300 and the inertial particle separator 2000 is that the inertial particle separator 2300 utilizes a foam block 2302 instead of the spring 2022. Accordingly, like numbering is used in describing the inertial particle separator 2300 and the inertial particle separator 2000 where like parts are designated. The foam block 2302 is arranged as a disc that surrounds the central tube 2012. The foam block 2302 is comprised of a spring-like foam that provides the spring biasing force to bias the poppet 2020 into the closed position. In some arrangements, the foam block 2302 may be porous such that air can flow through the foam block 2302. In such arrangements, the foam block 2302 can provide some filtration capacity for the inertial particle separator 2300 as air flows through the foam block 2302.

Figure 24C:
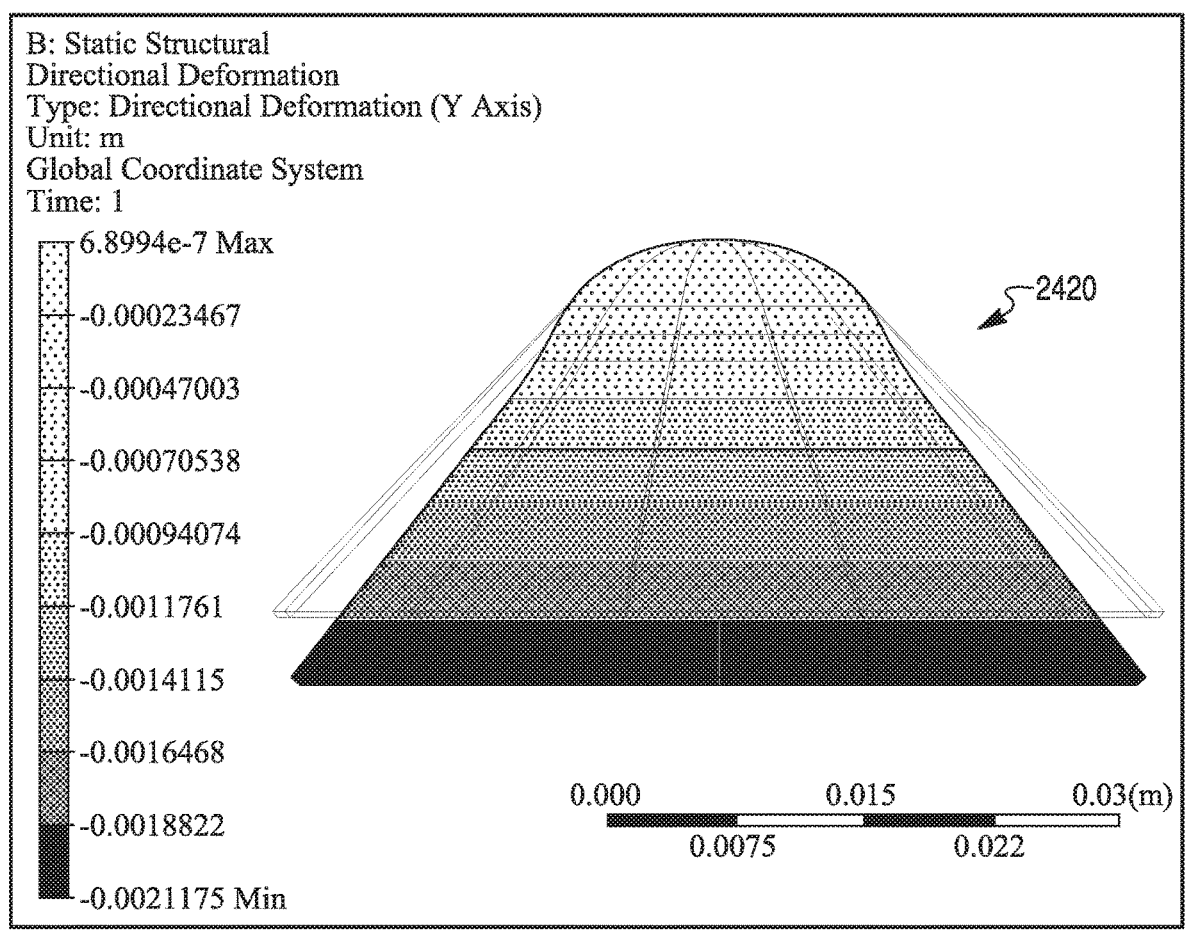

Referring to FIGS. 24A through 24G, views of an inertial particle separator 2400 are shown according to an example embodiment. FIG. 24A shows a cross-sectional view of the inertial particle separator 2400. FIG. 24B shows an exploded view of the inertial particle separator 2400. The inertial particle separator 2400 includes a housing 2402 having an inlet 2404 and a dust port 2406. In some arrangements, the dust port 2406 is fitted with a dust ejection valve, such as a rubber duckbill valve. The housing 2402 is removably coupled to an inner body 2408. In some arrangements, the housing 2402 presses a seal member against a surface of the inner body 2408. The inner body 2408 comprises a central tube 2412 that includes an outlet portion 2414 extending away from the housing 2402 and an inlet portion 2416 extending into a central compartment defined by the housing 2402. The inner body 2408 further comprises a poppet support 2418 positioned partially within the central tube 2412 and extending out past the outlet portion 2414. A poppet 2420 is secured to the poppet support 2418. The poppet 2420 a flexible poppet. Unlike the above-described poppets (e.g., the poppet 120), the poppet 2420 is not axially displaceable with respect to the poppet support 2418. Rather, the poppet 2420 radially flexible between a closed position (as shown in FIG. 24A), and a flexed, open position (as shown in FIGS. 24C-24G). In some arrangements, the poppet 2420 is comprised of silicone rubber. The poppet 2420 is shaped such that it is biased towards the closed position of FIG. 24A. Since the poppet 2420 itself is deformable, the inertial particle separator 2400 does not utilize a separate spring component. This design, therefore, reduces a component (as compared to the inertial particle separator 100), which should reduce cost. Additionally, since the poppet 2420 is stationary with respect to the poppet support 2418, there is a lower risk of the poppet 2420 becoming stuck in an open or closed position due to debris flowing through the inertial particle separator 2400

Generally, the flow of air through the inertial particle separator 2400 is designated by the flow path 2424. Air generally enters the housing 2402 through the inlet 2404. The air is turned by a curved outer surface of the poppet 2420. Additionally, the pressure of the air against the poppet 2420 air deforms the poppet 2420 to create a nozzle between the poppet 2420 and an inner surface of the housing 2402. The air then makes a sharp turn into the central tube 2412 and out the outlet portion 2414. At least a portion of the particles contained in the air upstream of the poppet 2420 (e.g., dirt, dust, debris, etc.) are separated by the sharp turn because the particles have a relatively higher mass compared to the air carrying the particles. The separated particles are routed into a dust radial discharge zone 2430 of the housing 2402, and out the dust port 2406.

Figure 24D:
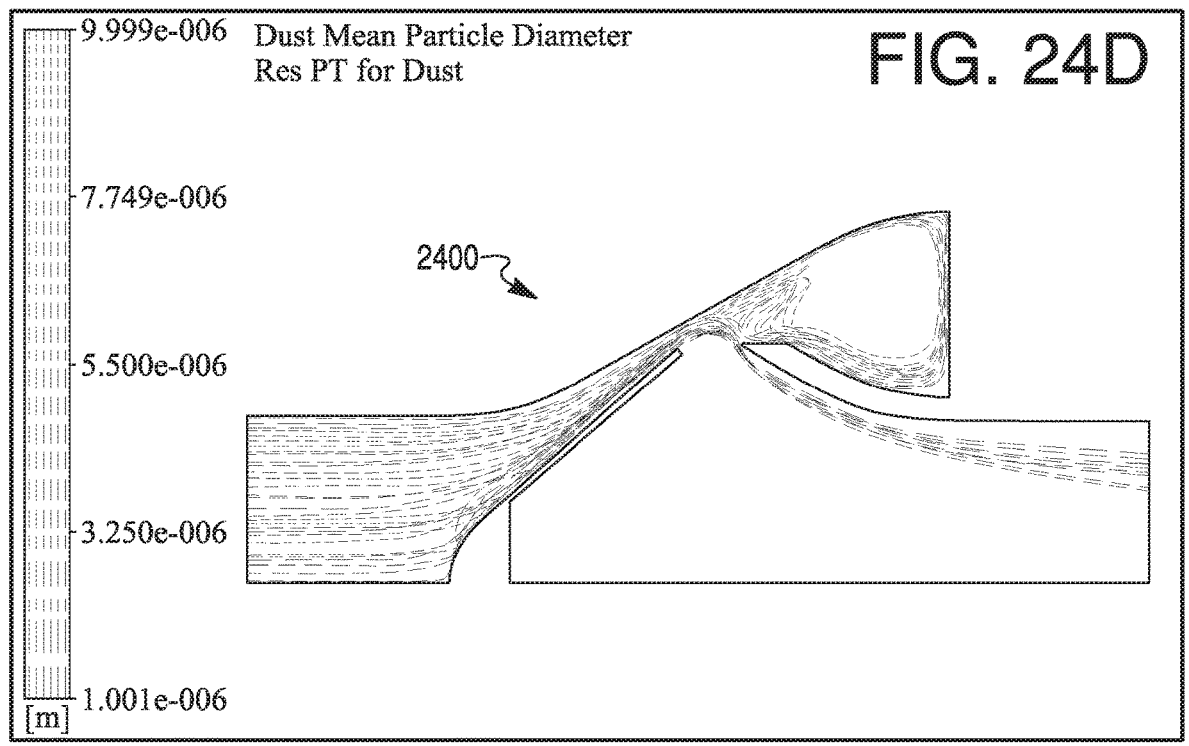
Figure 24E:
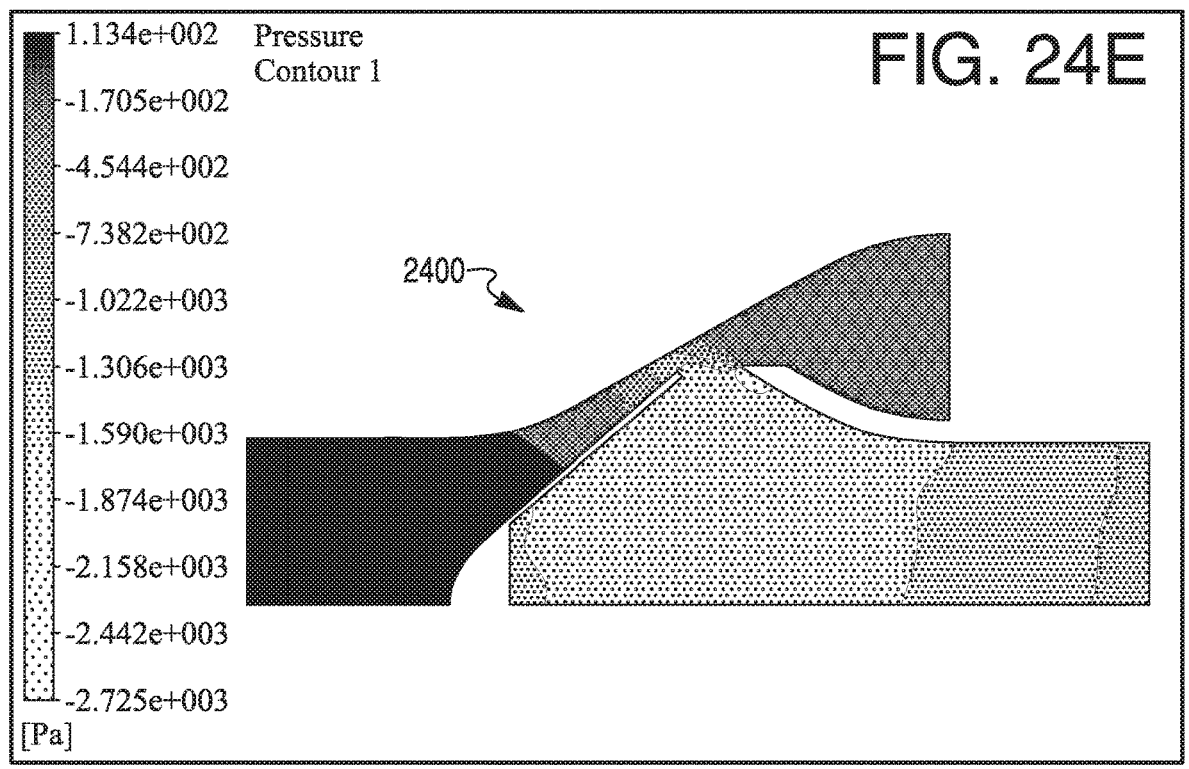
Figure 24F:
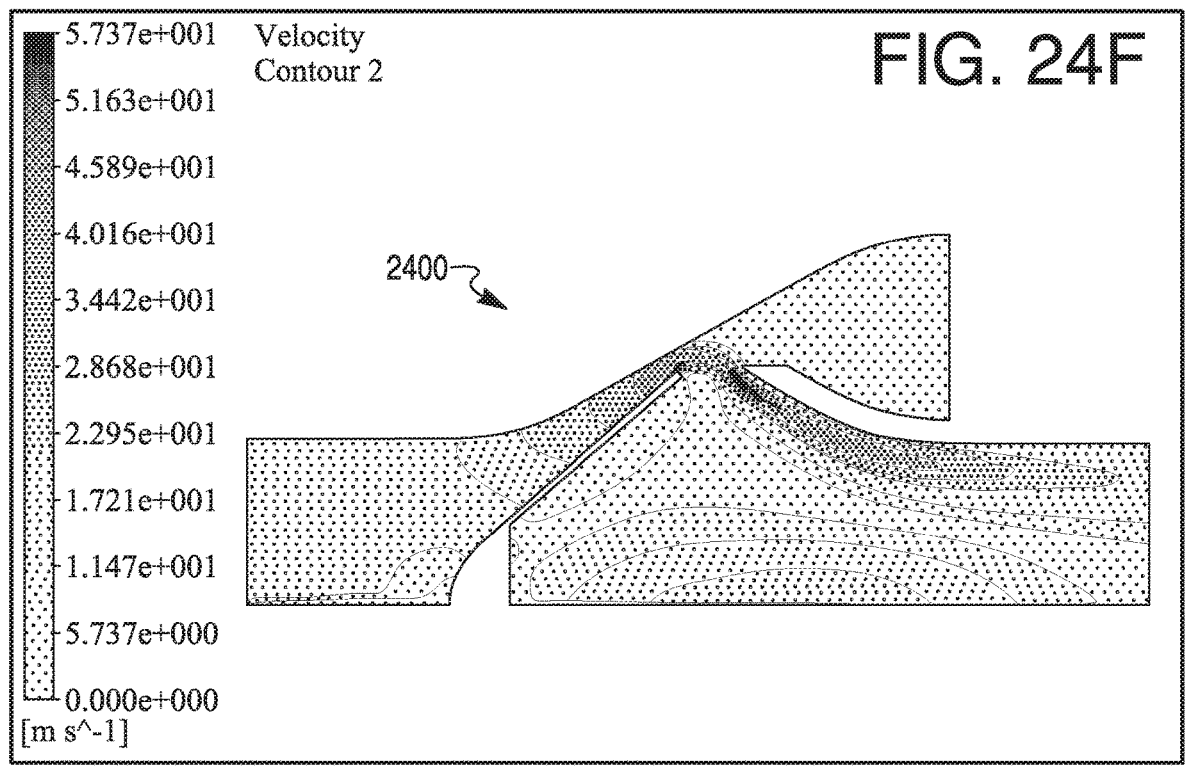
Figure 24G:
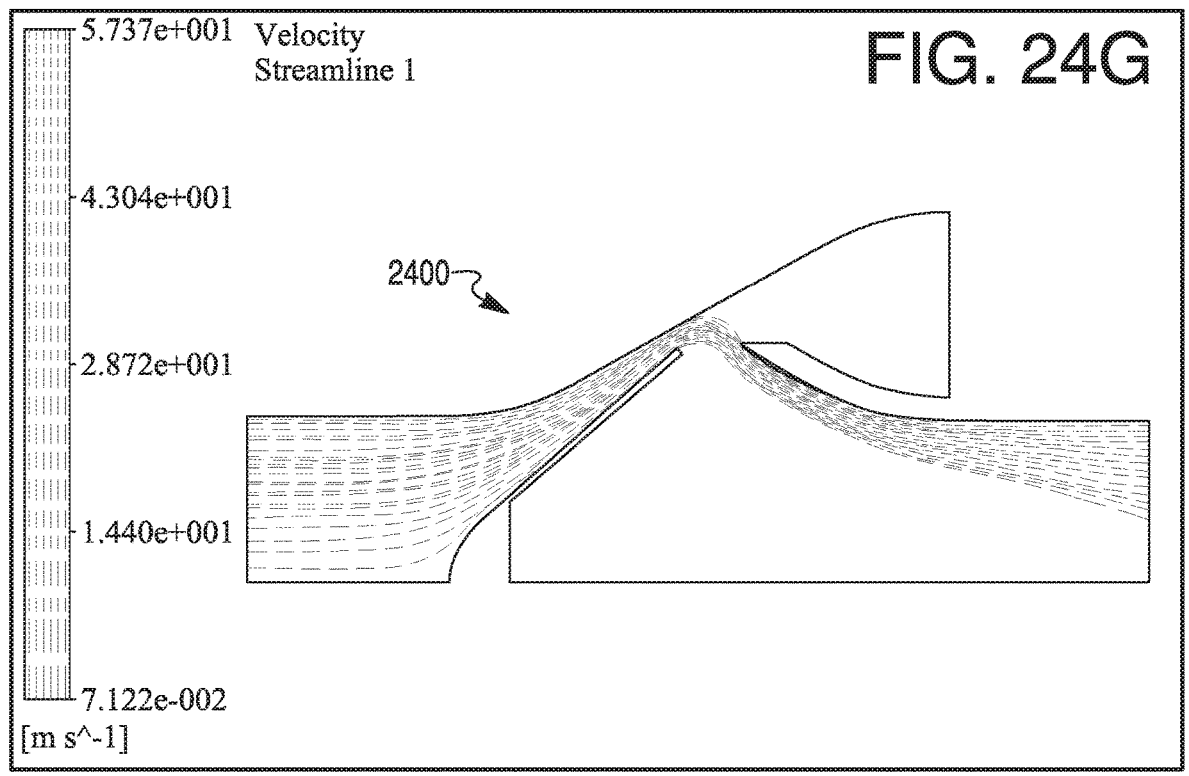

FIG. 24C shows the poppet 2420 as deformed under 1 kPa of pressure, which results in about 2.1 mm of displacement in the axial direction. FIG. 24D shows particle tracks demonstrating a particle cut size of about 4 microns in diameter for the inertial particle separator 2400. FIG. 24E shows a pressure contour for the inertial particle separator 2400, which shows a differential pressure between the outlet and inlet of about 1 kPa. FIG. 24F shows velocity contours for the inertial particle separator 2400, which demonstrates an increased velocity at the nozzle region and just downstream with the flow bends about 90 degrees. FIG. 24G shows velocity streamlines for the inertial particle separator 2400, which show very little flow entering the dust collection volume.

Figure 25A:
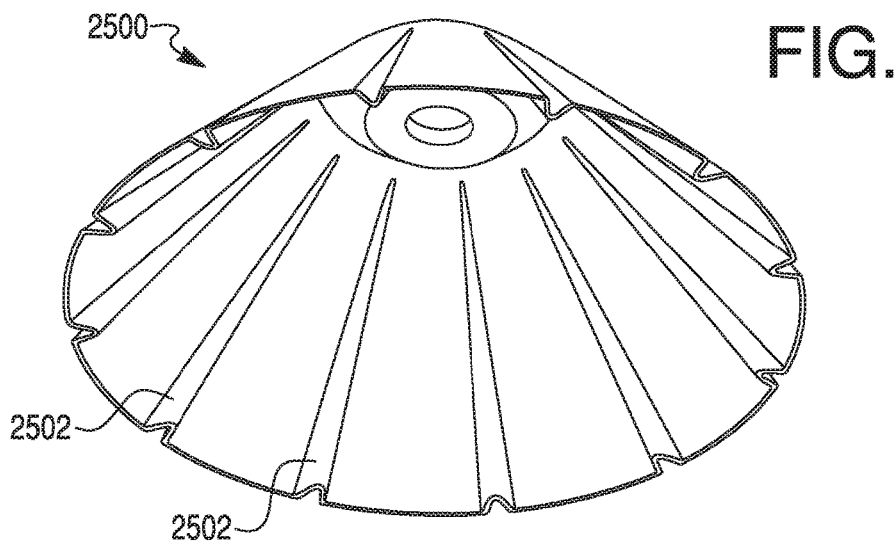
FIGS. 25A and 25B show views of an alternate poppet for use in the inertial particle separator shown in FIGS. 24A through 24G.
Figure 25B:
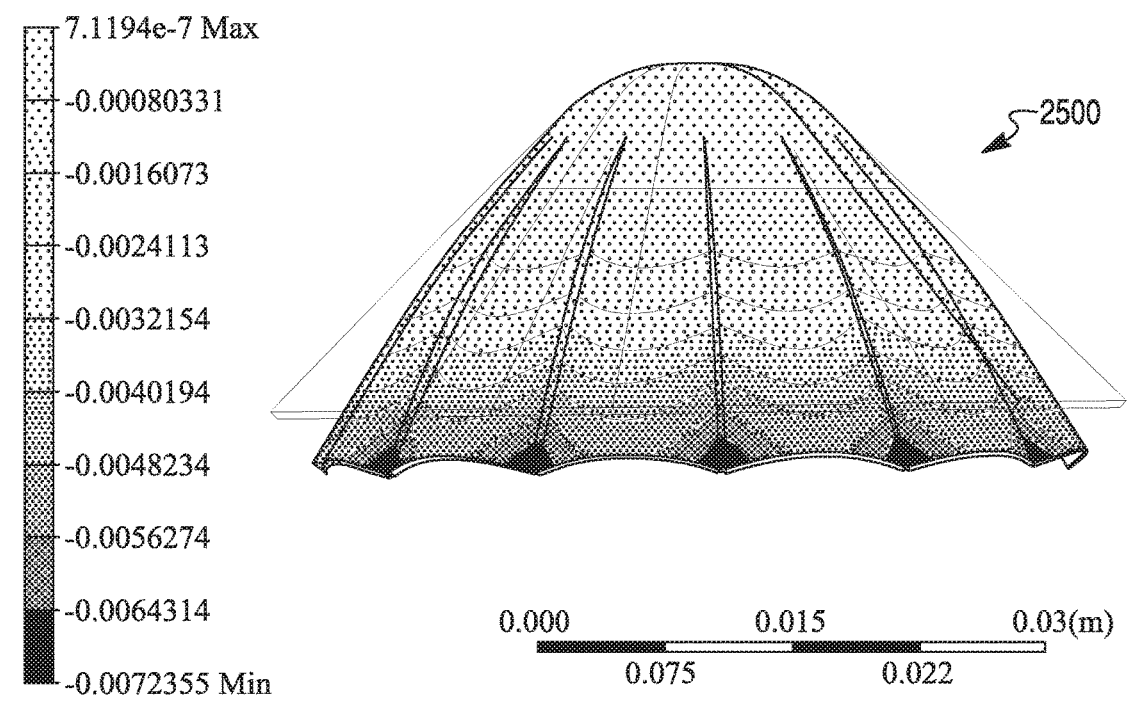

FIGS. 25A and 25B show views of an alternate poppet 2500 for use in the inertial particle separator 2400. The poppet 2500 allows for a greater deformation than the poppet 2420. The poppet 2500 a flexible poppet. The poppet 2500 is radially flexible between a closed position (e.g., as shown in FIG. 24A with respect to the poppet 2420), and a flexed, open position (e.g., as shown in FIGS. 24C-24G with respect to the poppet 2420, as shown in FIG. 25B). In some arrangements, the poppet 2500 is comprised of silicone rubber. The poppet 2500 is shaped such that it is biased towards the closed position. Unlike the poppet 2420, the poppet 2500 includes recesses 2502. The recesses create localized regions in which the poppet 2500 can locally deform circumferentially. This allows for an overall larger deformation of the poppet 2500 as compared to the poppet 2420 under similar operating conditions. For example, as shown in FIG. 25B, the poppet 2500 experiences 7.2 mm of deformation with the same 1 kPa pressure.

Referring to FIG. 26, a cross-sectional view of an inertial particle separator 2600 is shown according to an example embodiment. The inertial particle separator 2600 is substantially the same as the inertial particle separator 2400. Accordingly, like numbering used to designate like features between the inertial particle separator 2400 and the inertial particle separator 2600. The only difference between the inertial particle separator 2600 is the shape of the poppet support 2602. Unlike the poppet support 2418, the poppet support 2602 is designed with a larger, and more rounded shape with the intent of coming into contact with the poppet 2420 when the poppet 2420 deflects. The poppet support 2602 is configured to provide a non-linear force vs. deflection shape of the poppet 2420 by shaping the poppet support 2602 to gradually provide more and more support to (i.e., to come more and more into contact with) the poppet 2420 as the poppet 2420 deflects. This provides the advantage of limiting the effect of one side of the poppet 2420 opening entirely while the other side stays shut and the advantage of providing improved symmetry of poppet displacement.

Figure 27A:
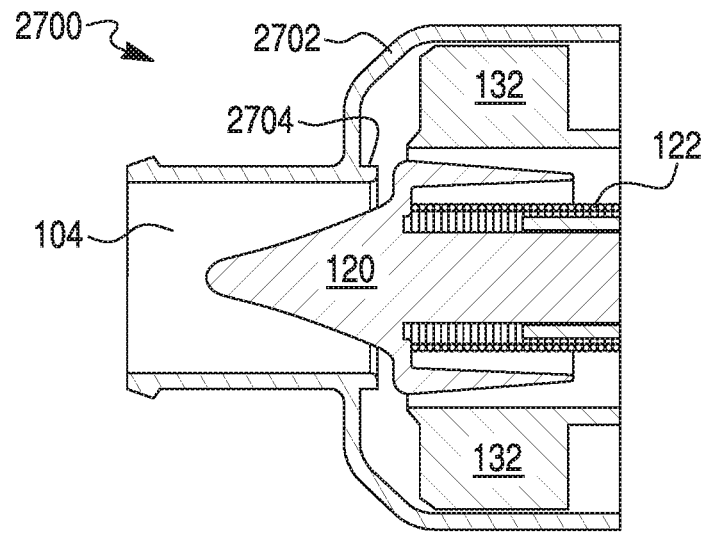
Figure 27B:
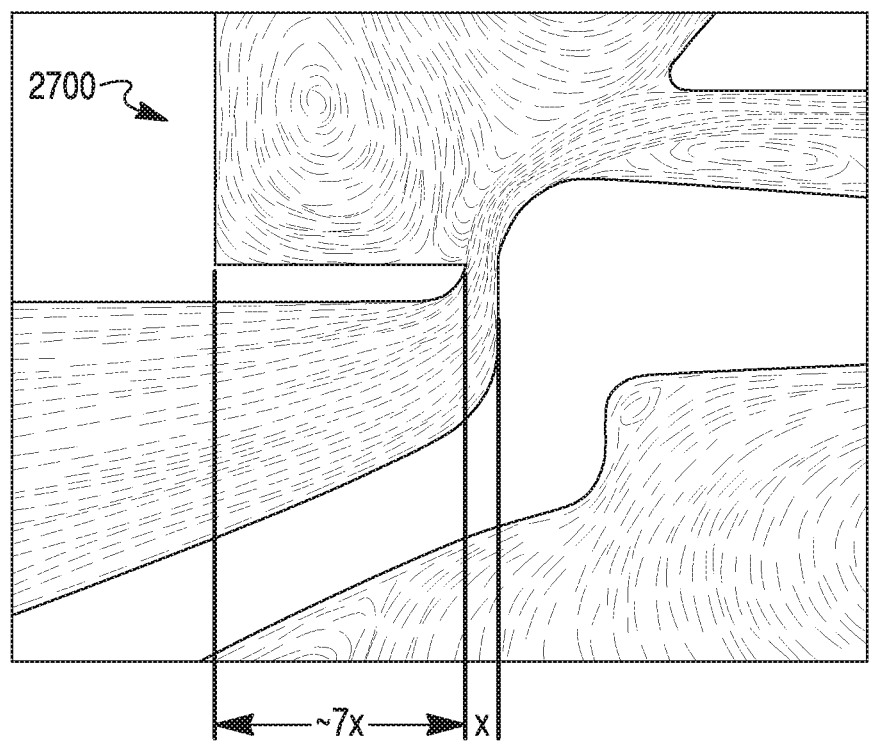

Referring to FIGS. 27A through 27D, views of a modified housing 2702 of the inertial particle separator 2700 are shown. FIG. 27A shows a cross-sectional view of the housing 2702. FIGS. 27B through 27D show flow simulations through the housing 102. The housing 2702 is shown as including an internal step 2704 (e.g., internal flange) extending from the inlet 104 into the central compartment defined by the housing 2702. During "small gap" conditions (i.e. corresponding to low air flowrate with a nearly-closed poppet valve clearance gap), the annular jet of air flowing through the housing 2702 attached itself to the nearby housing wall. This attachment is caused by the Coanda effect, attributed to low pressure zone and entrained air "pushing" the jet towards nearby wall. The resulting "wall-attached jet" (vs. the desired "sharp turn" to the outlet tube) sweeps through the dust collection chamber, causing reentrainment of separated dust. The inclusion of the internal step 2704 helps to eliminate the wall-attached jet behavior. The internal step 2704 also retains the desired sharp turn of the air flow path towards the outlet (throwing the particles into the dust collection chamber which remains largely quiescent, aside from low velocity secondary eddies circulating within the chamber). In some arrangements, the internal step 2704 is defined by a sharp corner with departure angle (from jet-tangent) of >30° and a wall step-back distance at least equal to or exceeding the annular jet thickness at the nearly-closed position where jet attachment occurs. As shown in the flow simulations of FIGS. 27B through 27D, the step-back distance is approximately seven times the thickness of the jet.

Figure 28A:
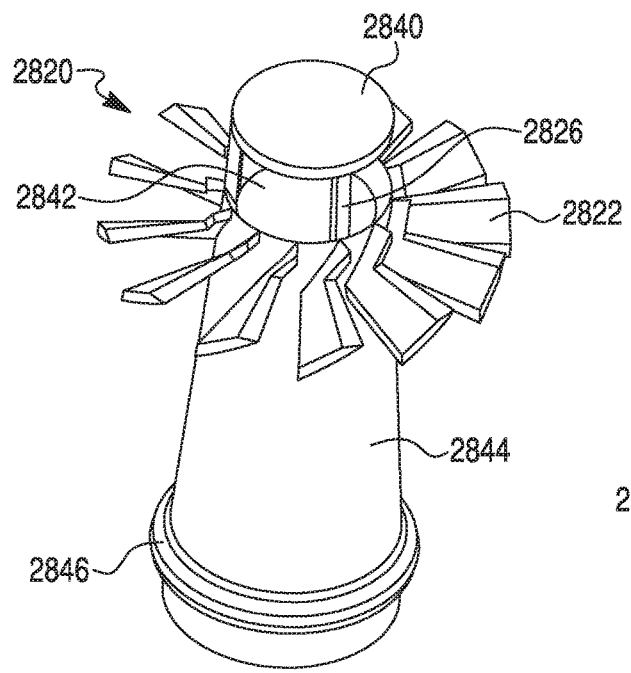
FIGS. 28A through 28C show views of a poppet and an inertial particle separator according to another example embodiment.
Figure 28C:
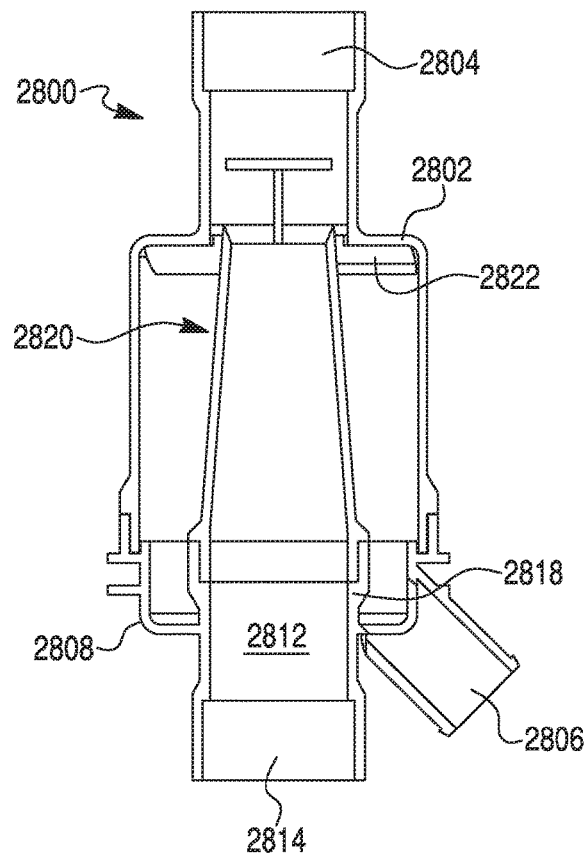
Figure 28B:
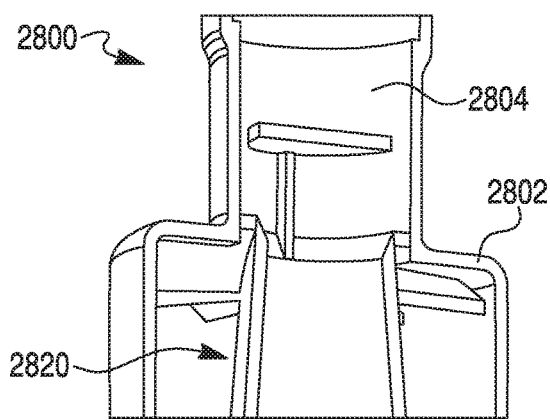

Referring to FIGS. 28A through 28C, views of a poppet 2820 are shown according to another example embodiment. The poppet 2820 is substantially the same as the poppet 120. The poppet 2820 may be installed in the inertial particle separator 100 in place of the poppet 120. A difference between the poppet 2820 and the poppet 120 is the poppet 2820 includes axially projecting baffle fins 2822 according to another example embodiment. Accordingly, like numbering is used in describing the poppet 120 and the poppet 2820. FIG. 28A shows a perspective view of the poppet 2820 and FIG. 28B shows a cross sectional view of the poppet 2820. FIG. 28C shows the poppet 2820 installed in the inertial particle separator 2800. In some embodiments, the poppet 2820 may be configured to be deformable or movable between a closed position (not shown; pressed against an inner surface of the housing 2802) and an open position (as shown in FIGS. 28A-28C with a gap between the baffle fins 2822 and housing 2802). In such embodiments, the poppet 2820 is biased towards the closed position by a biasing member coupled to the poppet 2820 and the inner body 2808. In other embodiments, and as shown in FIGS. 28A-28C, the poppet 2820 is static (e.g., does not move between a closed and open position.

The poppet 2820 comprises a flat top 2840, a cylindrical portion 2844 having a plurality of circumferential inlets 2826 connected to and downstream the flat top 2840, and a radially projecting surface 146 that is generally perpendicular to the central axis 126 and disposed around an outer surface of the cylindrical portion 2844. The space between the housing 2802 and the inner body 2808 downstream of the circumferential inlets 2028 defines a dust collection area. The baffle fins 2822 are disposed around an outer surface on the upper portion of the cylindrical portion 2844 disposed below the plurality of circumferential inlets 2826. The baffle fins 2822 may be disposed at a wide variety of angles and may be formed into a wide variety of sizes and numerosity. In some embodiments, the baffle fins 2822 are substantially overlapping (e.g., substantially continuous from an axial view) with a small gap between each baffle fin. During operation, air flows through the inlet 2804 towards the poppet 2820. The air flow then makes a sharp turn through the circumferential inlets 2826 causing entrained dust to fall into the dust collection area. The baffle fins 2822 aid in the retention of dust within the dust collection area as the large dust particles may bounce off the walls of the dust collection area and return to the inlet and/or travel into the circumferential inlets 2028. As will be appreciated, the baffle fins 2822 have a negligible impact on differential pressure across the inertial particle separator 2800 since very little flow goes into the chamber.

Figure 29A:
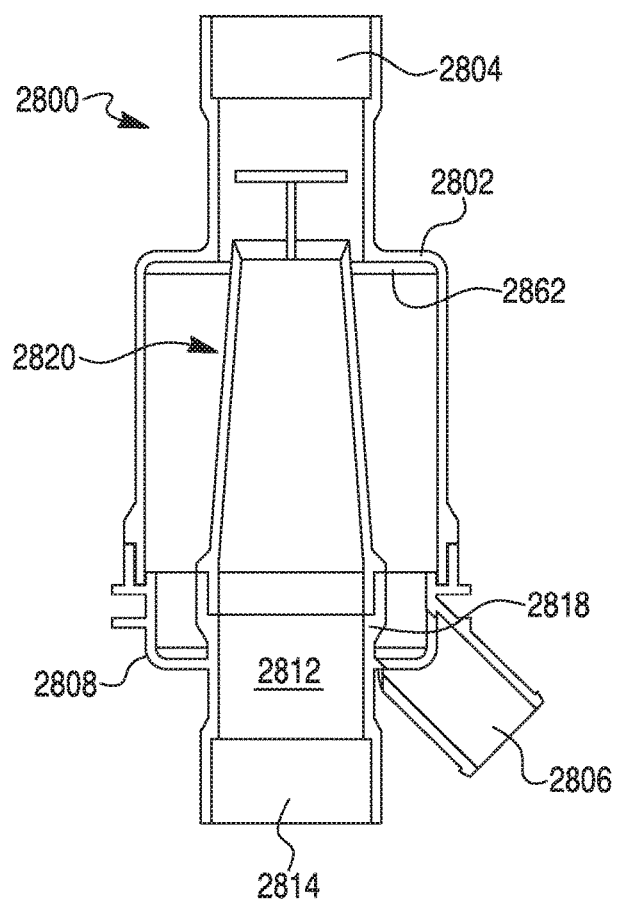
FIGS. 29A and 29B show views of a poppet and an inertial particle separator according to yet another example embodiment.
Figure 29B:
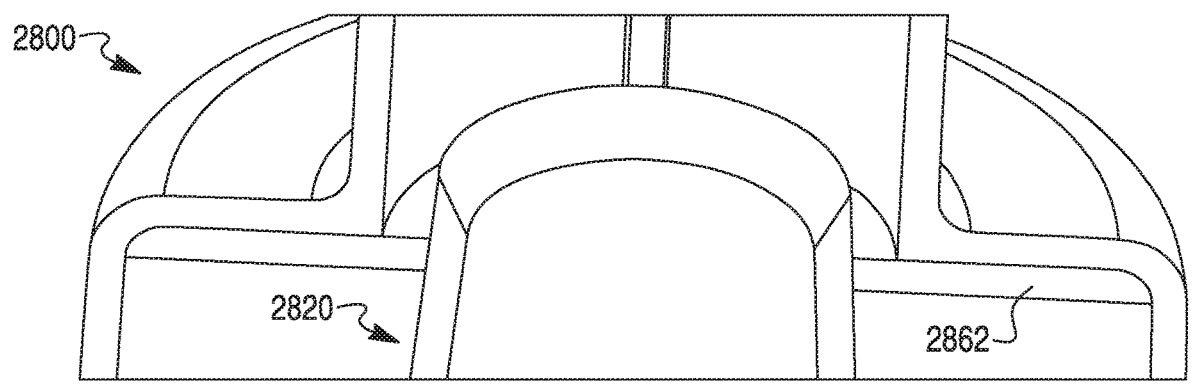

Referring to FIGS. 29A and 29B, views of a poppet 2920 are shown according to another example embodiment. The poppet 2920 is substantially the same as the poppet 2820. The poppet 2920 may be installed in the inertial particle separator 2800 in place of the poppet 2820. A difference between the poppet 2920 and the poppet 2820 is the poppet 2920 includes a foam block disc 2862 according to another example embodiment. Accordingly, like numbering is used in describing the poppet 2820 and the poppet 2920. FIG. 29A shows a perspective view of the poppet 2920 installed in the inertial particle separator 2900 and FIG. 29B shows a cross sectional view of the poppet 2920. FIG. 28C shows the poppet 2920 installed in the inertial particle separator 2800. In some embodiments, the poppet 2920 may be configured to be deformable or movable between a closed position (not shown; pressed against an inner surface of the housing 2802) and an open position (as shown in FIGS. 29A & 29B with a gap between the foam block disc 2862 and housing 2802). In such embodiments, the poppet 2920 is biased towards the closed position by a biasing member coupled to the poppet 2920 and the inner body 2808. In other embodiments, and as shown in FIGS. 29A & 29B, the poppet 2920 is static (e.g., does not move between a closed and open position).

The poppet 2920 comprises a flat top 2840, a cylindrical portion 2844 having a plurality of circumferential inlets 2826 connected to and downstream the flat top 2840, and a radially projecting surface 146 that is generally perpendicular to the central axis 126 and disposed around an outer surface of the cylindrical portion 2844. The space between the housing 2802 and the inner body 2808 downstream of the circumferential inlets 2028 defines a dust collection area. The foam block disc 2862 is disposed around an outer surface on the upper portion of the cylindrical portion 2844 disposed below the plurality of circumferential inlets. In some embodiments, the foam block disc 2862 has a pore size within a range of 30 to 60 pores per inch. During operation, air flows through the inlet 2804 towards the poppet 2920. The air flow then makes a sharp turn through the circumferential inlets 2826 causing entrained dust to fall into the dust collection area. The foam block disc 2862 aids in the retention of dust within the dust collection area as the large dust particles may bounce off the walls of the dust collection area and return to the inlet and/or travel into the circumferential inlets 2028. As will be appreciated, the foam block disc 2862 has a negligible impact on differential pressure across the inertial particle separator 2900, since very little flow goes into the chamber.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

As used herein, the term "substantially" and "approximately" mean plus or minus 10% of the associated value or range of values.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. An inertial particle separator comprising:
    a housing defining a central compartment, the housing comprising an inlet and a dust port;
    an inner body coupled to the housing, the inner body comprising a central tube having a first end extending into the central compartment and a second end defining an outlet; and
    a poppet positioned adjacent to the first end of the central tube, the poppet movable or deformable between a closed position, in which the first end is blocked, and an open position, in which the first end is at least partially unblocked, the poppet being biased to the closed position.

2. The inertial particle separator of claim 1, wherein a spring biases the poppet to the closed position, the spring disposed between the inner body and the poppet.

3. The inertial particle separator of claim 2, wherein the poppet is axially displaceable along a central axis defined by the central tube between the closed position and the open position.

4. The inertial particle separator of claim 1, wherein the poppet comprises:
a conical top within the inlet;
a radially projecting surface connected to and downstream from the conical top, the radially projecting surface generally perpendicular to a central axis of the central tube, the radially projecting surface causing air to travel substantially perpendicular to the central axis; and
a skirt connected to the radially projecting surface, the skirt extending away from the first end toward the central compartment.

5. The inertial particle separator of claim 4, wherein the conical top further comprises axially projecting swirl fins disposed around an outer curved surface, the axially projecting swirl fins causing air flowing past the poppet to enter into a swirling flow.

6. The inertial particle separator of claim 4, wherein an outer surface of the skirt is angled with respect to an inner surface of the central tube.

7. The inertial particle separator of claim 4, wherein the inner body further comprises a poppet support member positioned within the central tube and coupled to the poppet.

8. The inertial particle separator of claim 7, wherein the poppet further comprises a centering post extending away from the radially projecting surface toward the central compartment and disposed within the skirt, the centering post configured to be received in slots of the poppet support member in a sliding manner.

9. The inertial particle separator of claim 4, further comprising a radial dust discharge space between the housing and inner body, the radial dust discharge space receiving particles separated from an air flow as the air flow travels along the radially projecting surface toward the skirt, the radial dust discharge space in fluid communication with the dust port.

10. The inertial particle separator of claim 4, wherein the conical top further comprises a plurality of axially projecting swirl vanes disposed on an upstream end of the conical top within the inlet, the plurality of axially projecting swirl vanes configured to impart a tangential velocity on an airflow through the inlet prior to the air reaching the radially projecting surface.

11. The inertial particle separator of claim 4, wherein the housing further comprises an internal flange extending from the inlet into the central compartment defined by the housing, the internal flange configured to limit wall-attached jet behavior by an air flow through the housing.

12. The inertial particle separator of claim 1, wherein the inner body further comprises a poppet support member positioned within the central tube and coupled to the poppet, a plurality of outer support ribs, and a plurality of inner support ribs,
each outer support rib of the plurality of outer support ribs disposed around an outer surface of the inner body, the plurality of outer support ribs support the central tube against an inner surface of the housing,
each inner support rib the plurality of inner support ribs disposed around an inner surface of the inner body and adjacent to the poppet support member, the plurality of inner support ribs center and support the poppet support member within the central tube.

13. The inertial particle separator of claim 1, further comprising a suction device in fluid communication with the central compartment via the outlet, the suction device configured to cause the poppet to move to the open position when the suction device is active.

14. The inertial particle separator of claim 1, wherein the poppet is movable or deformable between the closed position and the open position by a pressure of air moving through the inlet toward the outlet.

15. The inertial particle separator of claim 1, wherein the poppet comprises axially projecting swirl fins that cause air flowing past the poppet to enter into a swirling flow.

16. The inertial particle separator of claim 1, wherein the poppet comprises:
a dome top adjacent to the first end of the central tube, the dome top comprising a plurality of circumferentially arranged legs extending from a surface of the dome top towards the inlet;
a radially projecting surface connected to and downstream from the dome top, the radially projecting surface generally perpendicular to a central axis of the central tube, the radially projecting surface causing air to travel substantially perpendicular to the central axis; and
a skirt connected to the radially projecting surface, the skirt extending away from the first end toward the central compartment,
wherein the plurality of circumferentially arranged legs are configured to secure a spring against the housing within the inlet of the housing, wherein the spring biases the poppet to the closed position.

17. The inertial particle separator of claim 1, wherein the poppet is comprised of a flexible material such that the poppet is deformable between the closed position and the open position.

18. The inertial particle separator of claim 1, wherein the poppet comprises a plurality of baffle fins adjacent the first end of the central tube, the plurality of baffle fins configured to retain dust in a space between the housing and the inner body.

19. The inertial particle separator of claim 1, wherein the poppet comprises a foam disc adjacent the first end of the central tube, the foam disc configured to retain dust in a space between the housing and the inner body.

20. An inertial particle separator comprising:
a housing defining a central compartment, the housing comprising an inlet and a dust port;
an inner body coupled to the housing, the inner body comprising a central tube having a first end extending into the central compartment and a second end defining an outlet; and
a poppet disposed over an outer surface of the central compartment and positioned adjacent to the first end of the central tube, the poppet movable or deformable between a closed position, in which the first end is blocked, and an open position, in which the first end is at least partially unblocked, the poppet being biased to the closed position.

21. The inertial particle separator of claim 20, wherein the poppet comprises:
a dome top adjacent to the first end of the central tube;
a cylindrical portion connected to and downstream from the dome top, the cylindrical portion having a plurality of circumferential inlets configured to receive air from the inlet when the poppet is in the open position; and
an angled skirt extending outwardly from an outer surface of the cylindrical portion, the angled skirt extending away from the first end toward the central compartment.

22. The inertial particle separator of claim 21, wherein a spring biases the poppet to the closed position, the spring disposed between the inner body and the angled skirt, wherein the poppet is axially displaceable along a central axis defined by the central tube between the closed position and the open position.

23. The inertial particle separator of claim 21, wherein a deformable reentrainment skirt biases the poppet to the closed position, the deformable reentrainment skirt disposed between the inner body and the angled skirt, wherein the poppet is axially displaceable along a central axis defined by the central tube between the closed position and the open position.

24. The inertial particle separator of claim 21, wherein a deformable reentrainment skirt biases the poppet to the closed position, the deformable reentrainment skirt disposed between the inner body and the angled skirt and the deformable reentrainment skirt comprises a cylindrical protrusion around an outer surface of the deformable reentrainment skirt that is concentrically tangent with respect to the central tube.

25. The inertial particle separator of claim 21, wherein a foam block biases the poppet to the closed position, the foam block disposed between the inner body and the angled skirt and is arranged as a disc that surrounds the central tube, wherein the poppet is axially displaceable along a central axis defined by the central tube between the closed position and the open position.

26. An inertial particle separator comprising:
a housing defining a central compartment, the housing comprising an inlet and a dust port;
an inner body coupled to the housing, the inner body comprising a central tube having a first end extending into the central compartment and a second end defining an outlet; and
a flexible poppet disposed over an outer surface of the central compartment and positioned adjacent to the first end of the central tube, the poppet deformable between a closed position, in which the first end is blocked, and an open position, in which the first end is at least partially unblocked, the poppet being biased to the closed position.

27. The inertial particle separator of claim 26, wherein the inner body further comprises a poppet support positioned partially within the central tube and extending toward the outlet, the poppet support configured to engage the poppet, wherein the poppet is stationary with respect to the poppet support, and wherein the poppet is radially flexible between a closed position and a flexed, open position.

28. The inertial particle separator of claim 26, wherein the inner body further comprises a poppet support positioned partially within the central tube and extending toward the outlet, the poppet support configured to engage the poppet, wherein the poppet is radially flexible between a closed position and a flexed, open position, and wherein the poppet support is a rounded poppet support that contact the poppet when the poppet is in the flexed, open position.

* * * * *